May 23, 1933.  N. A. LUDINGTON  1,910,398
TRANSPORTATION MEANS
Filed May 7, 1932   20 Sheets-Sheet 1

INVENTOR.
Nelson A. Ludington
By: A. D. T. Libby
ATTORNEY

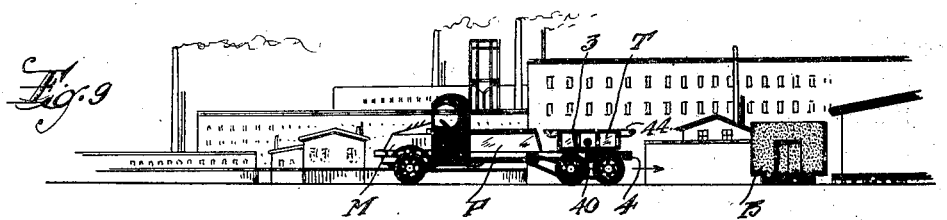
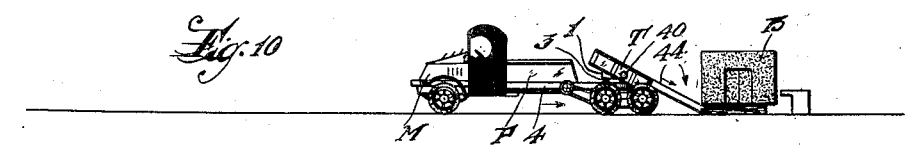
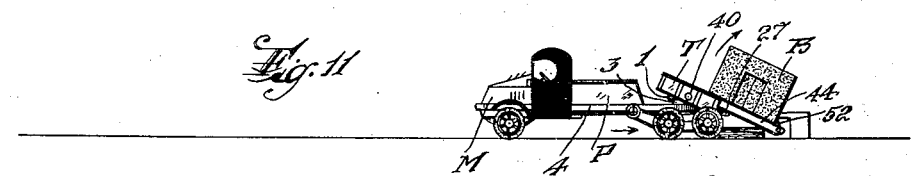
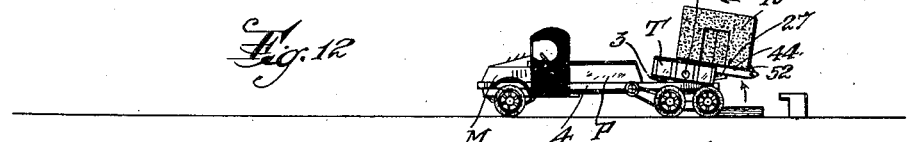
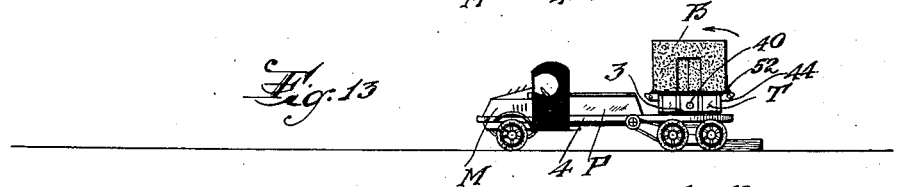
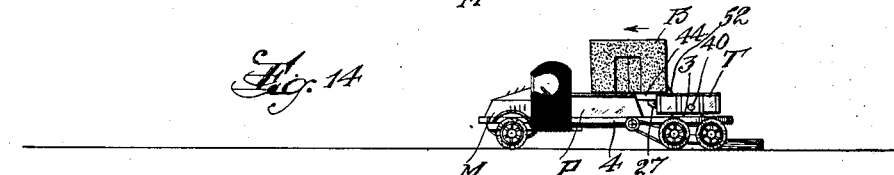
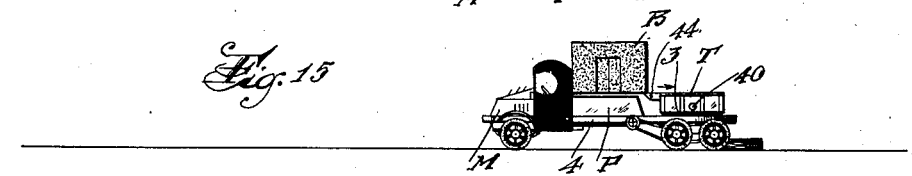
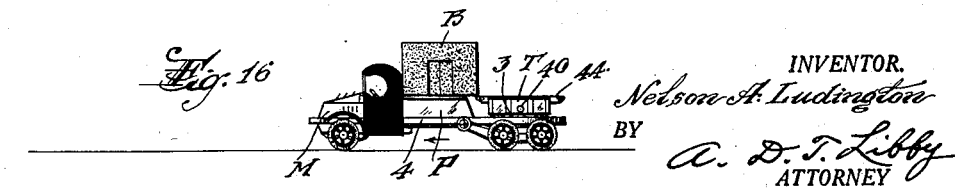

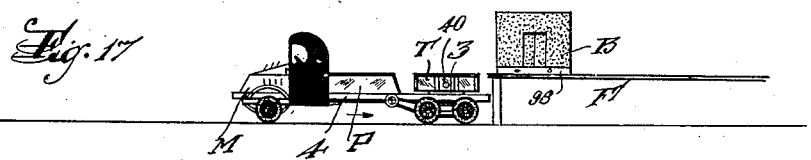
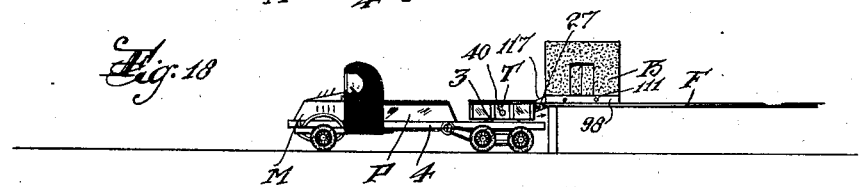
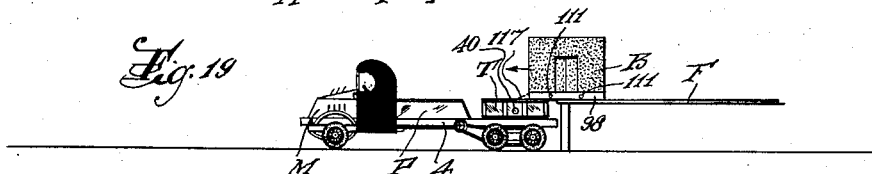
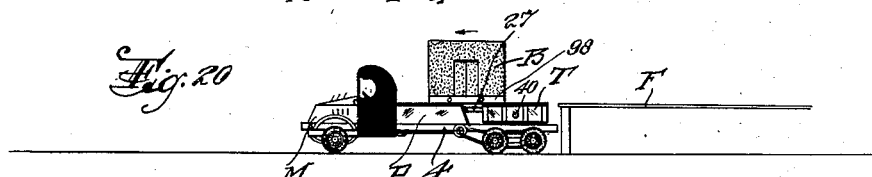
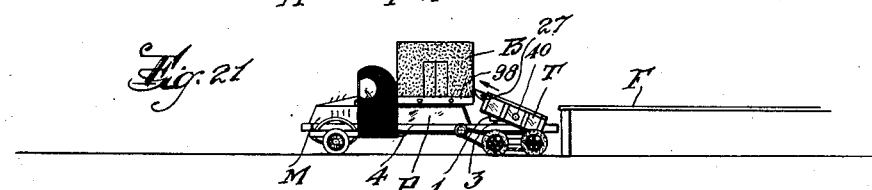
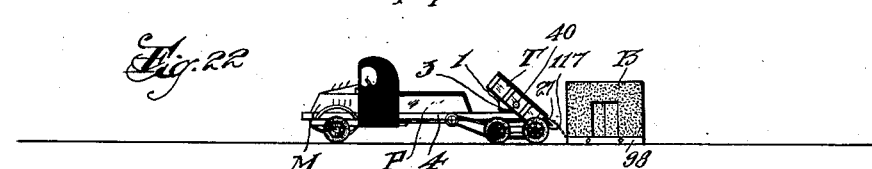
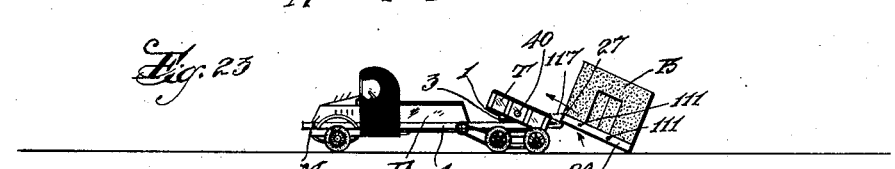
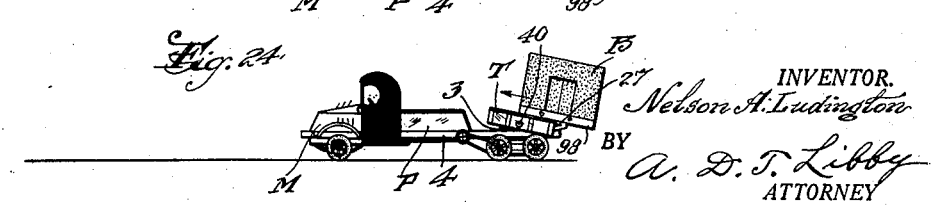

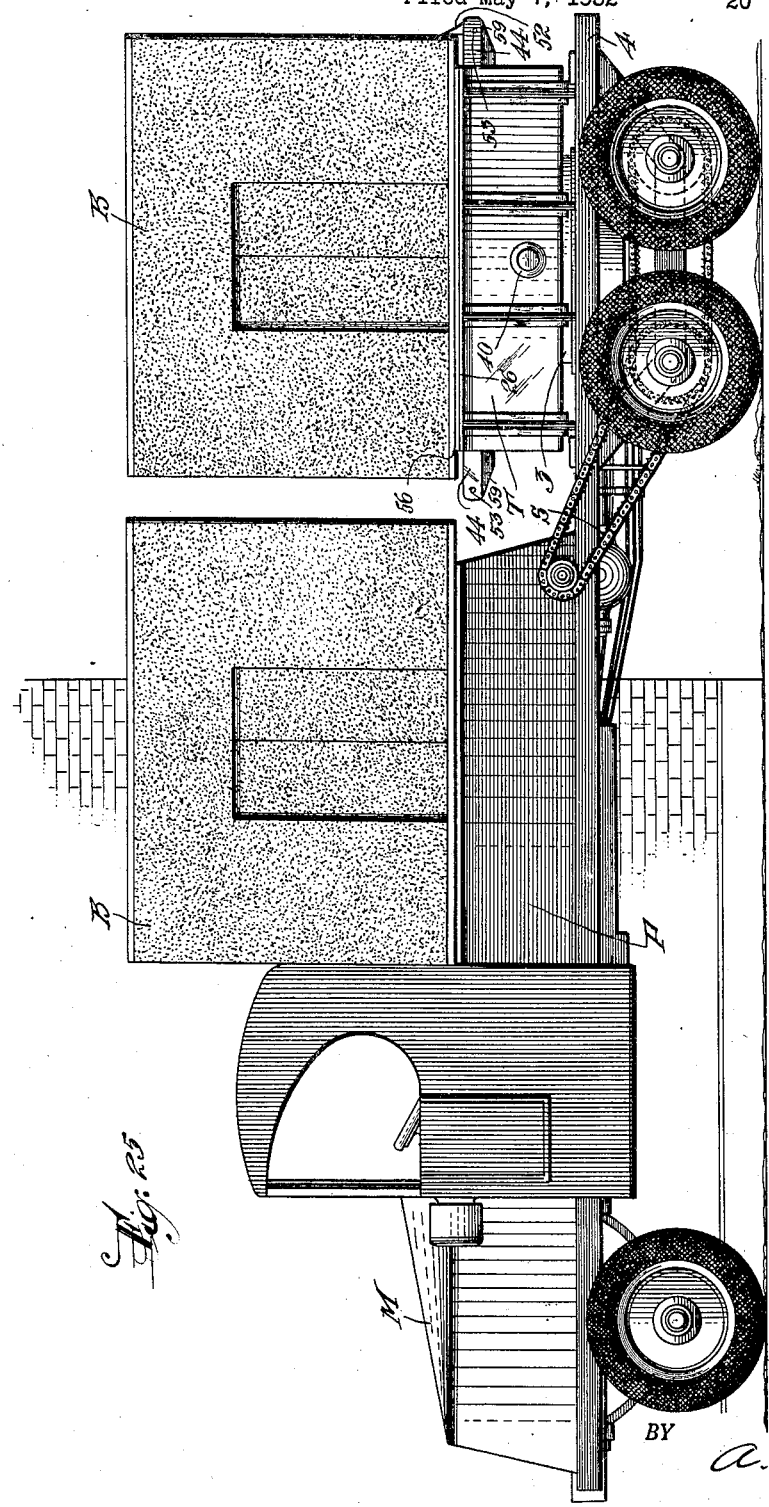

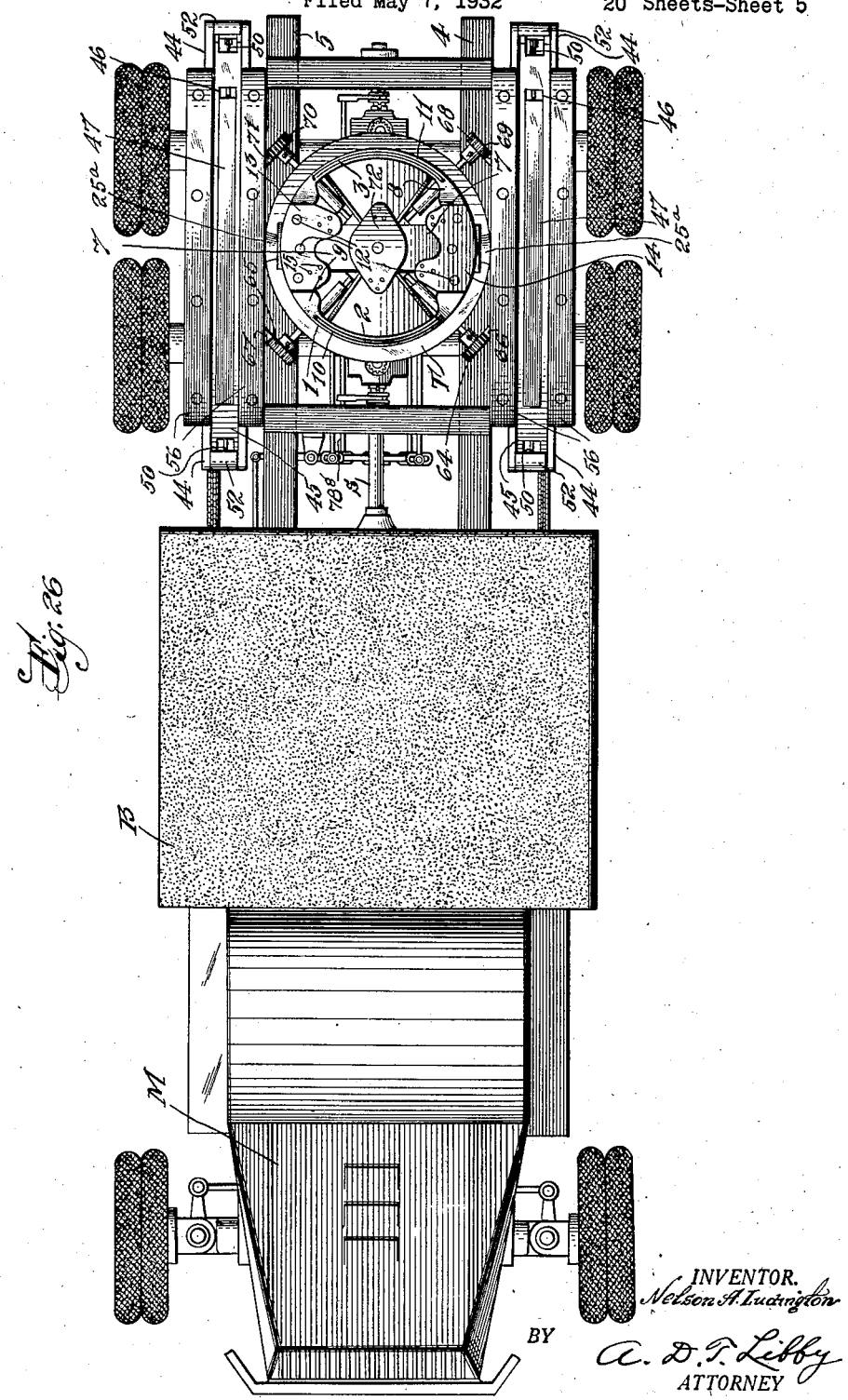

May 23, 1933.   N. A. LUDINGTON   1,910,398
TRANSPORTATION MEANS
Filed May 7, 1932   20 Sheets-Sheet 6
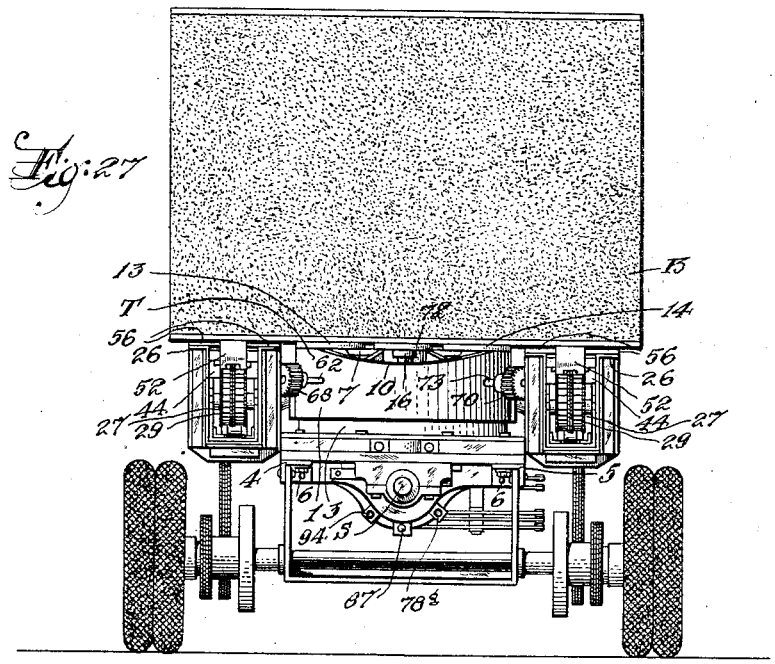
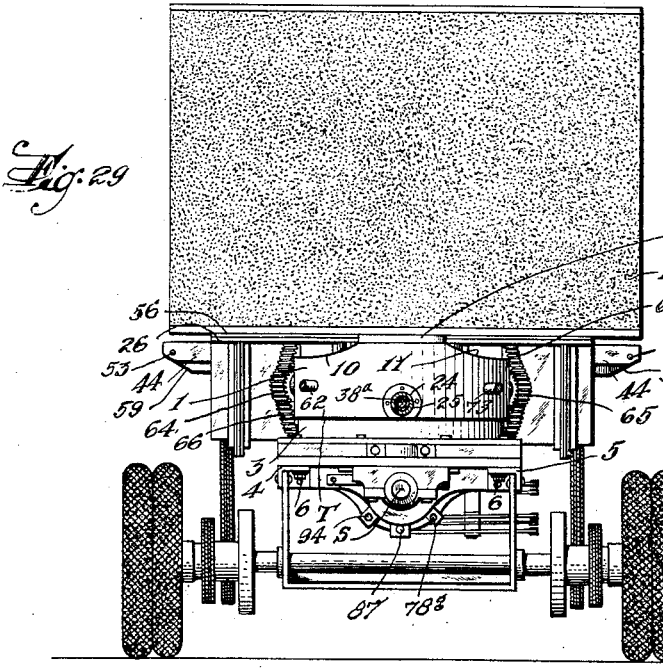
INVENTOR.
Nelson A. Ludington
BY
A. D. T. Libby
ATTORNEY

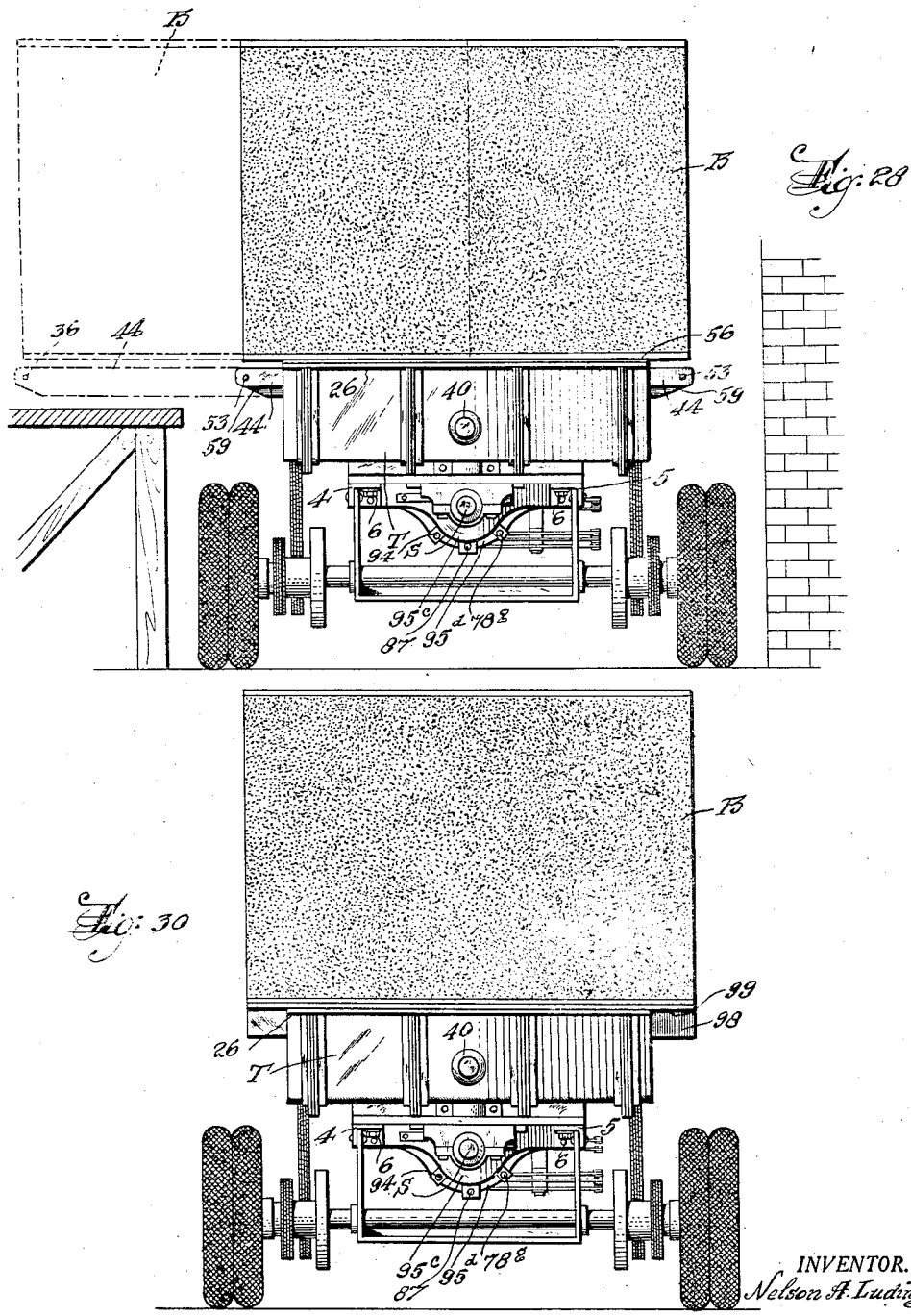

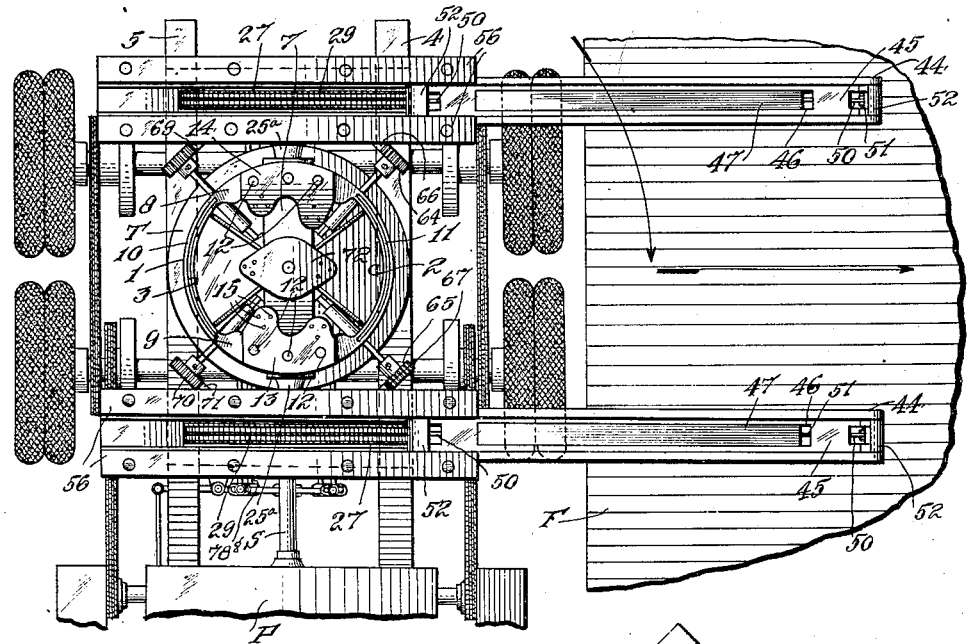
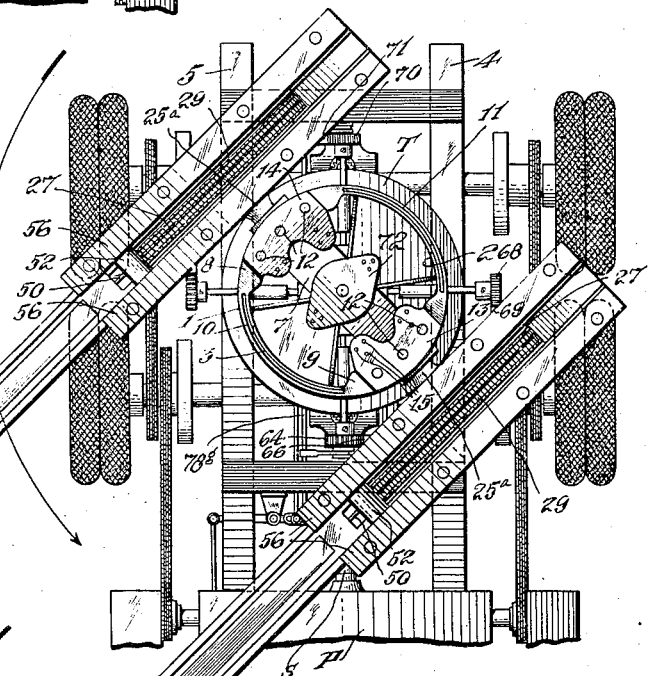

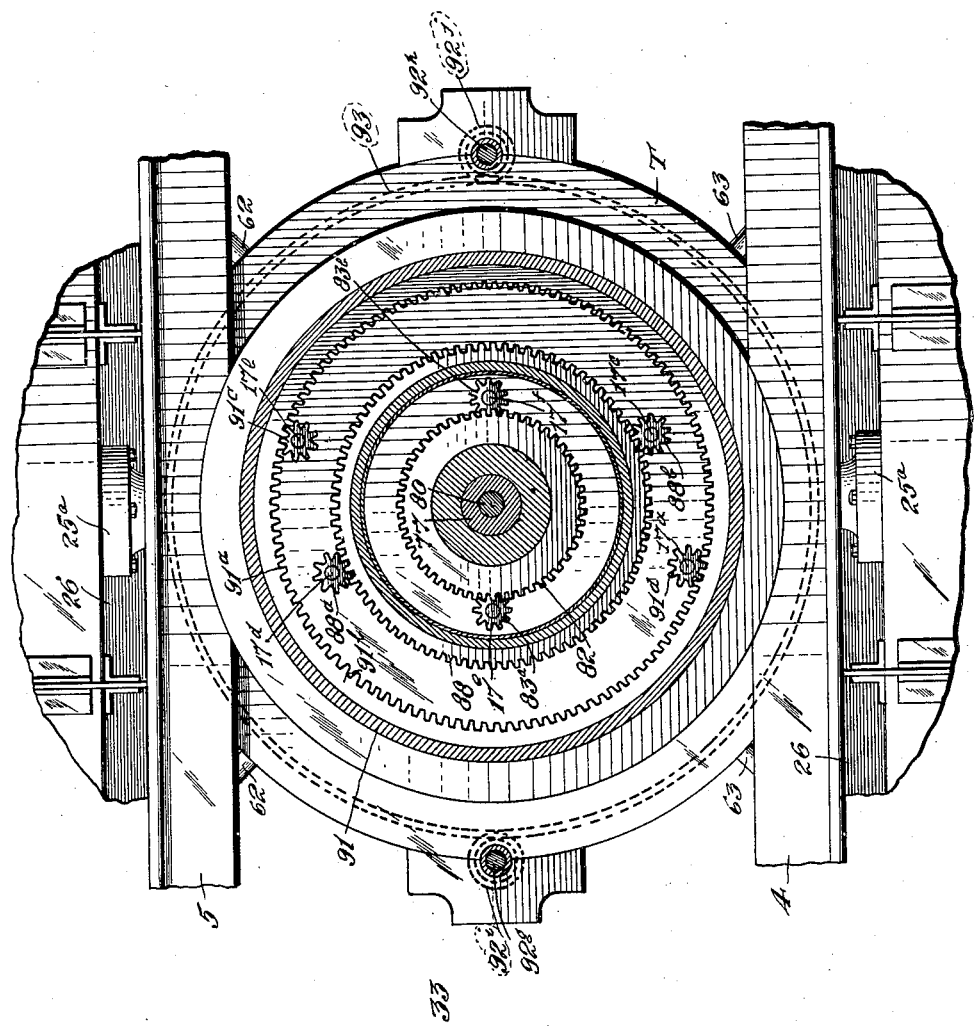

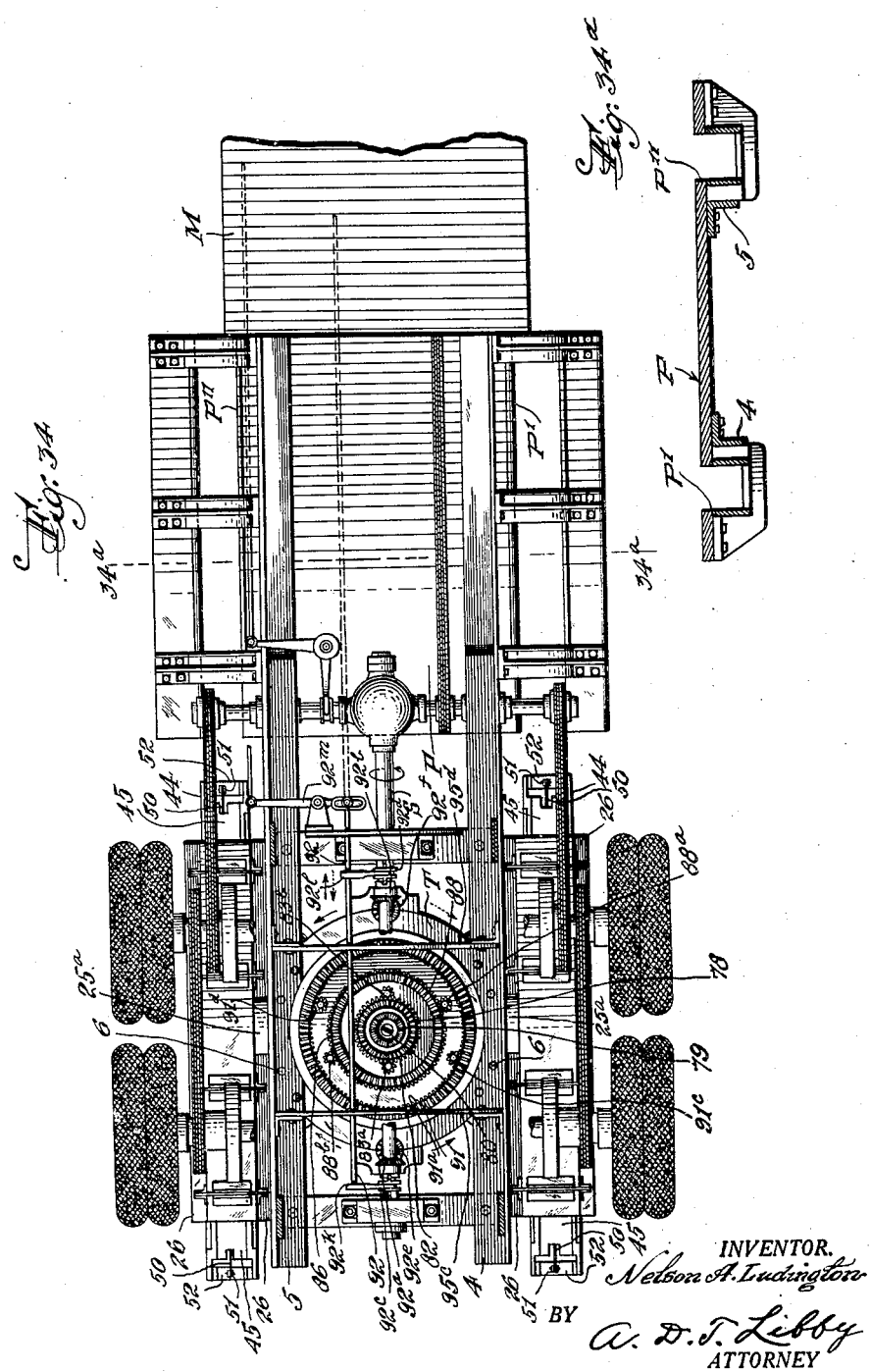

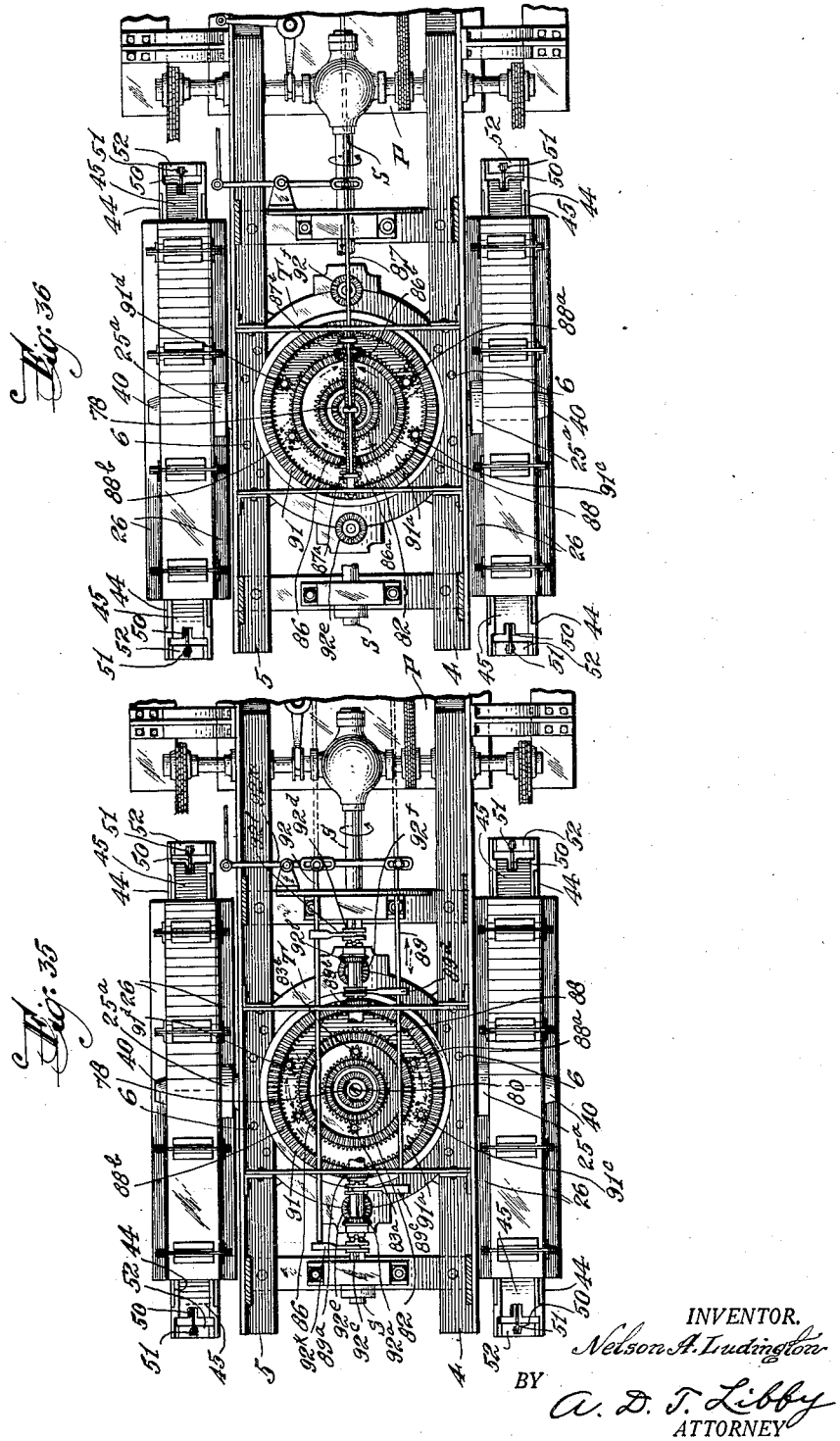

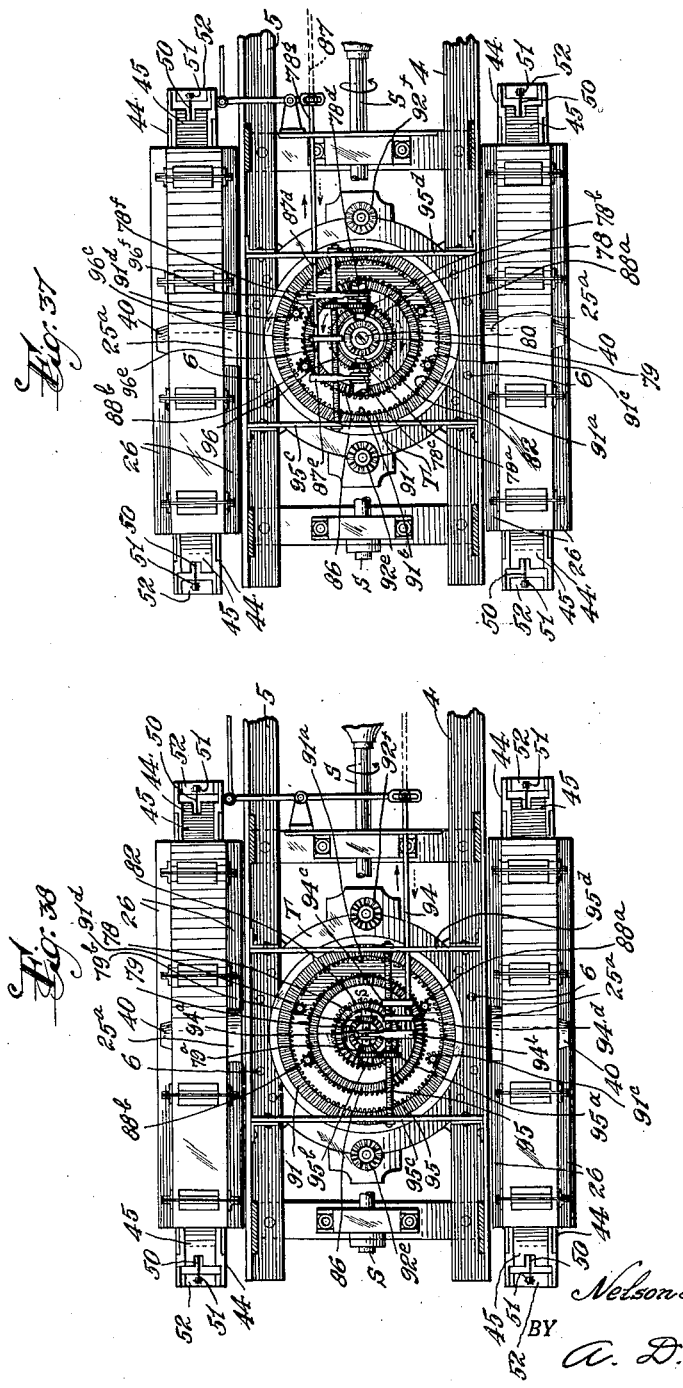

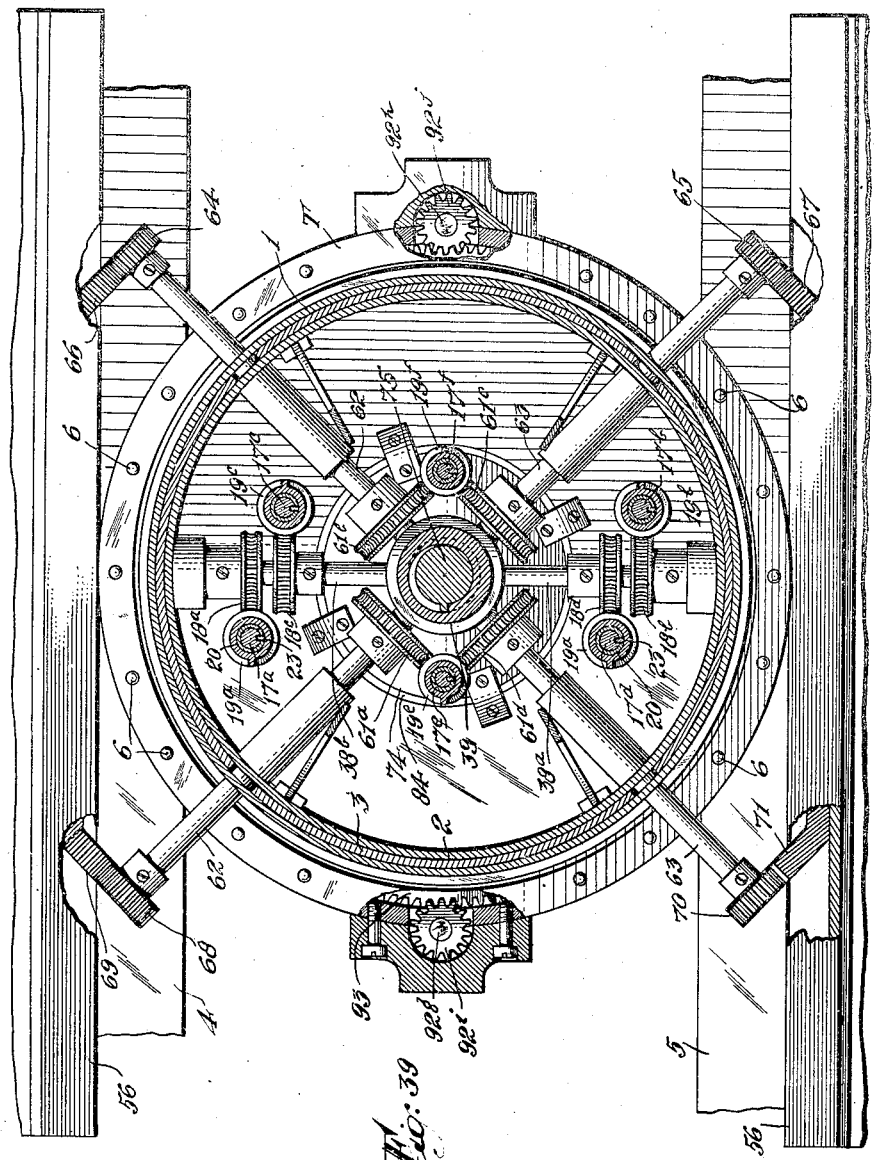

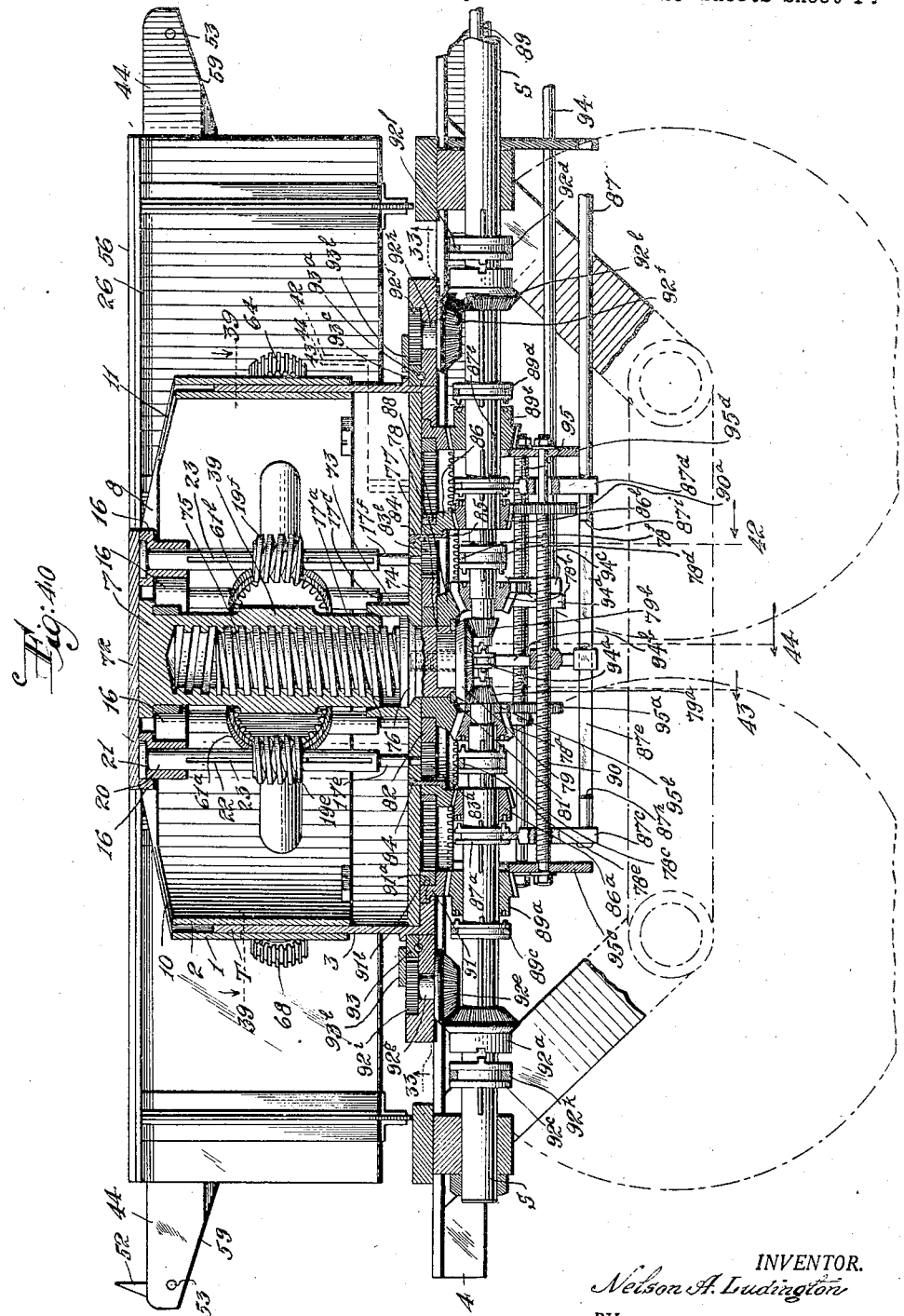

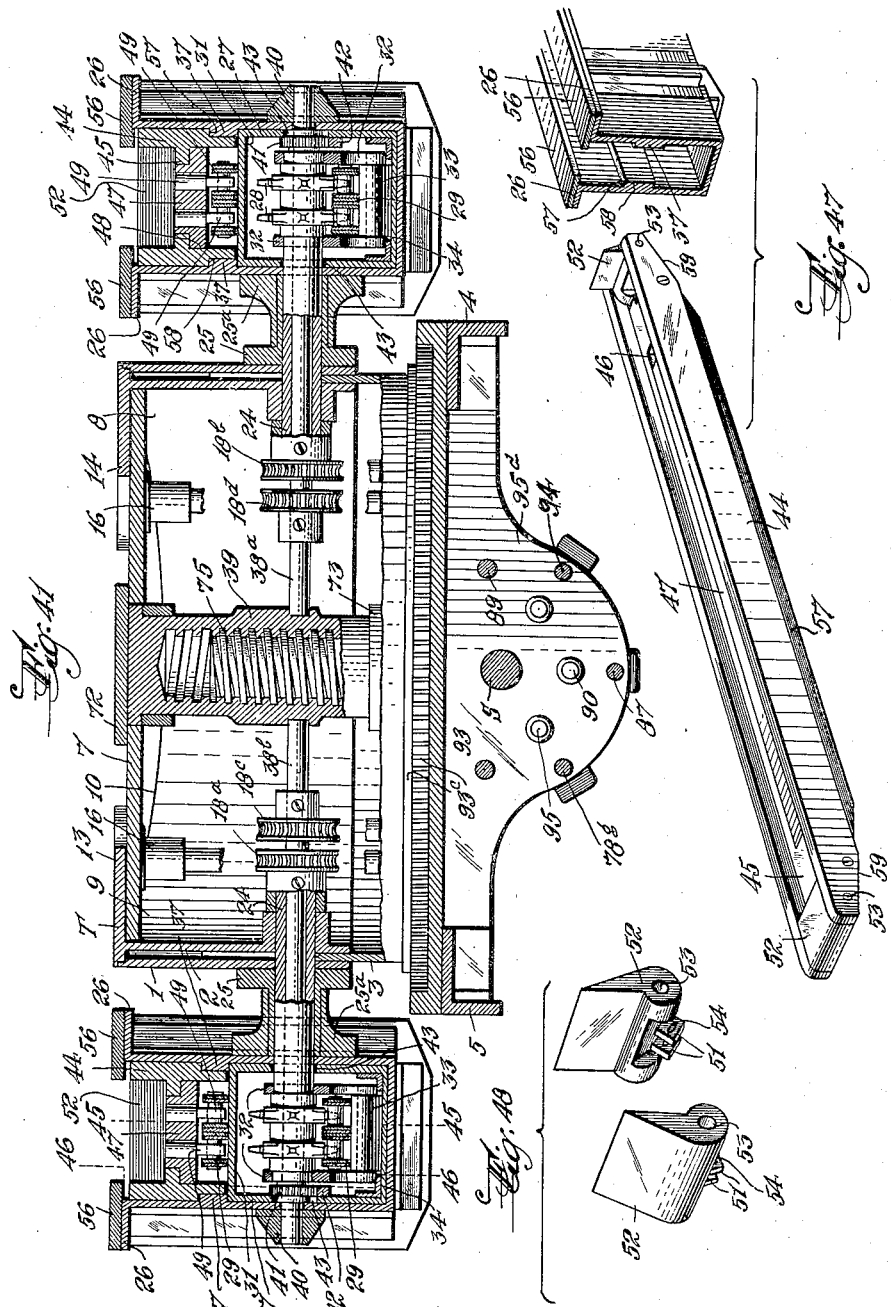

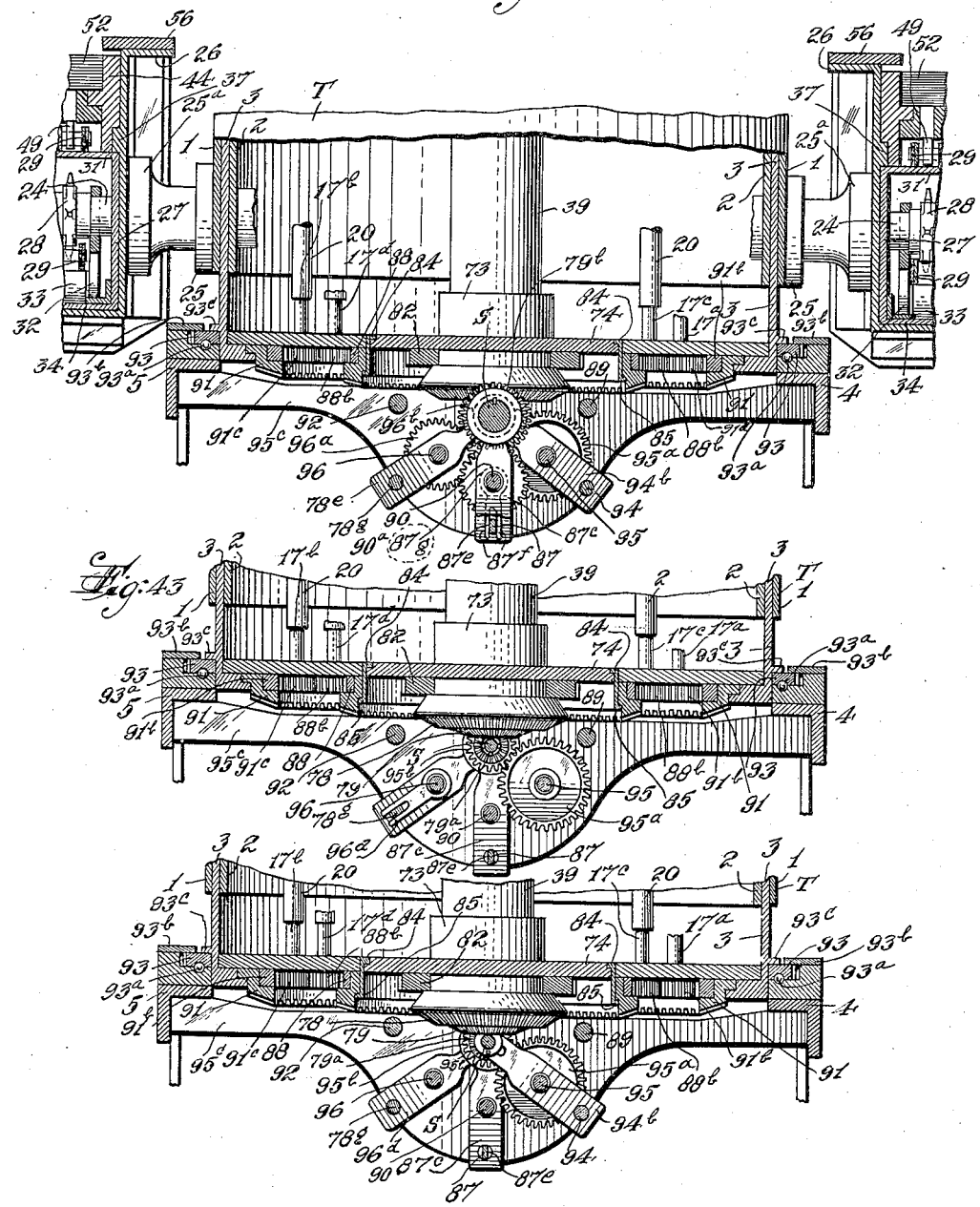

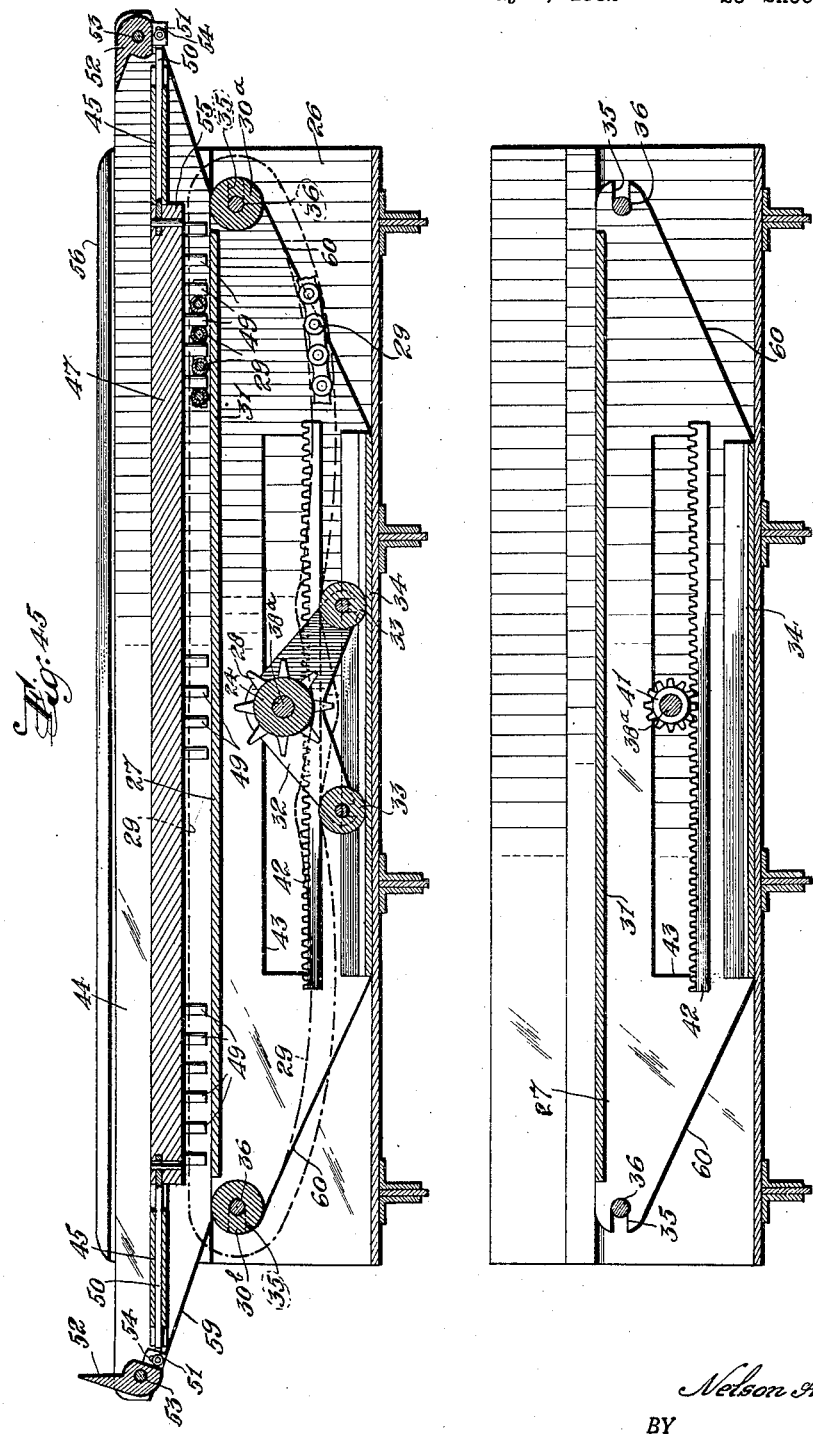

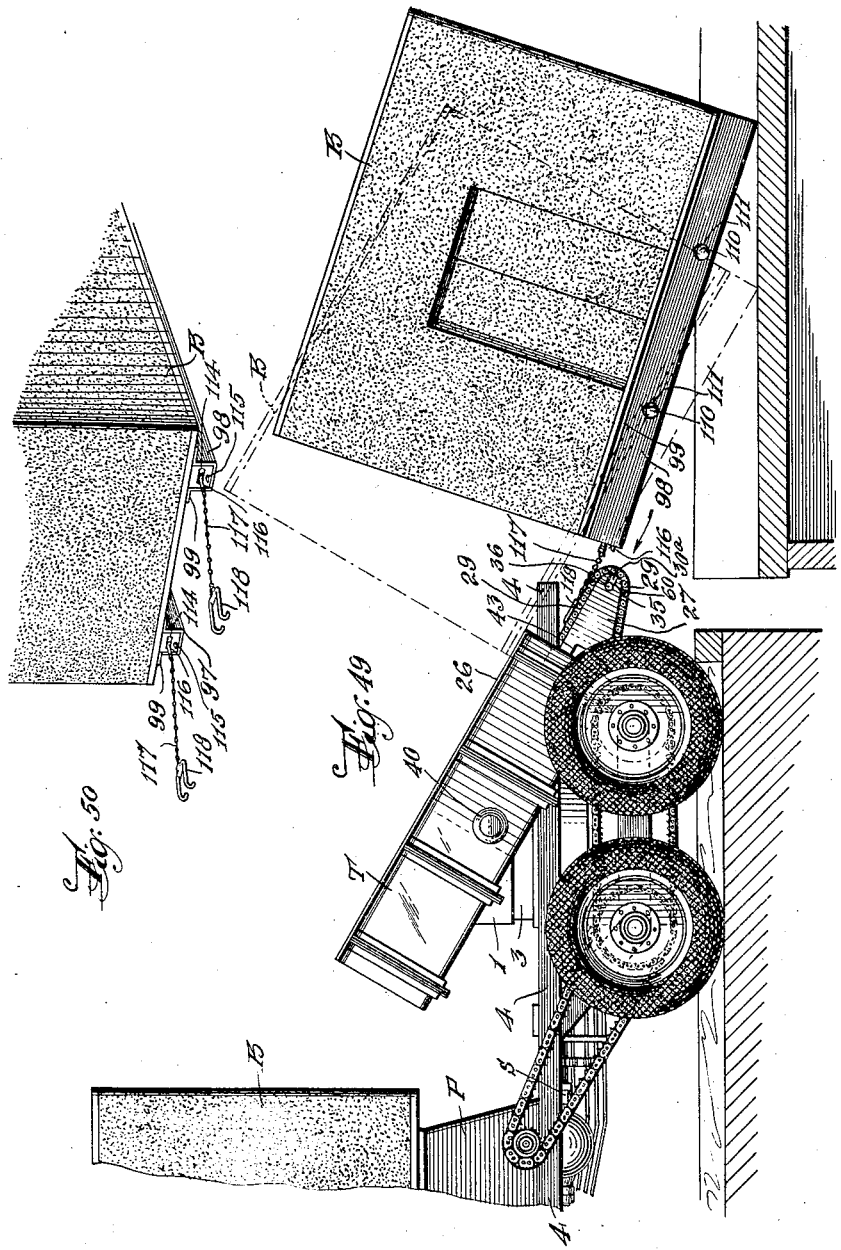

May 23, 1933.  N. A. LUDINGTON  1,910,398
TRANSPORTATION MEANS
Filed May 7, 1932   20 Sheets-Sheet 19
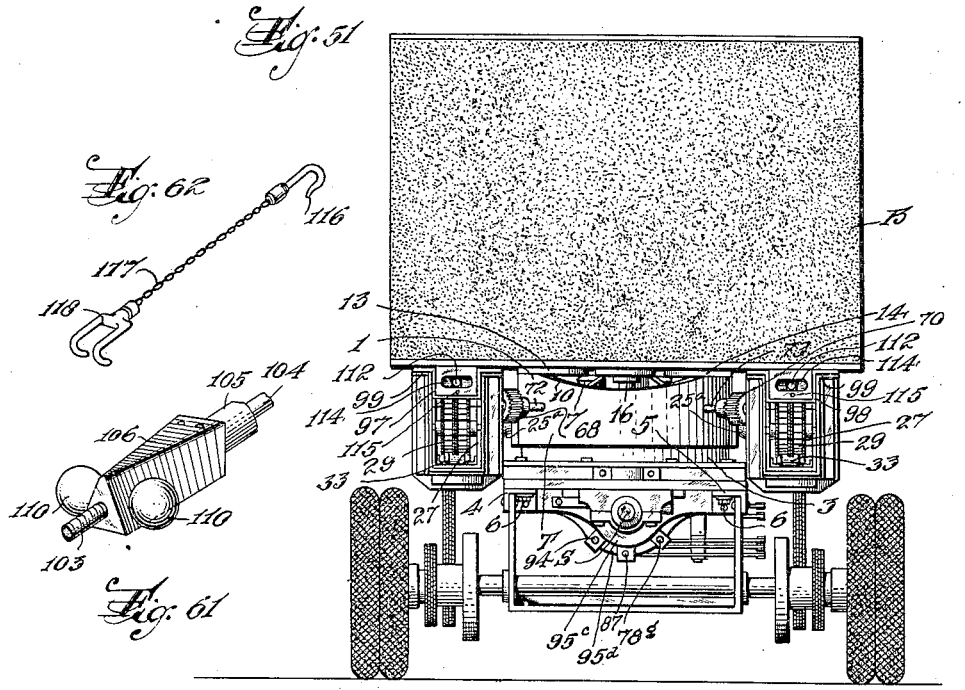
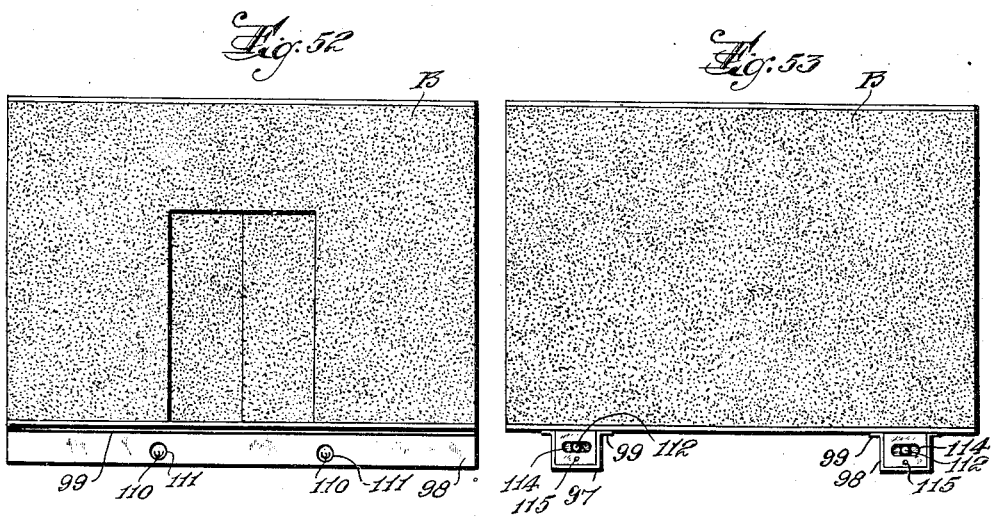
INVENTOR.
Nelson A. Ludington
BY
A. D. T. Libby
ATTORNEY

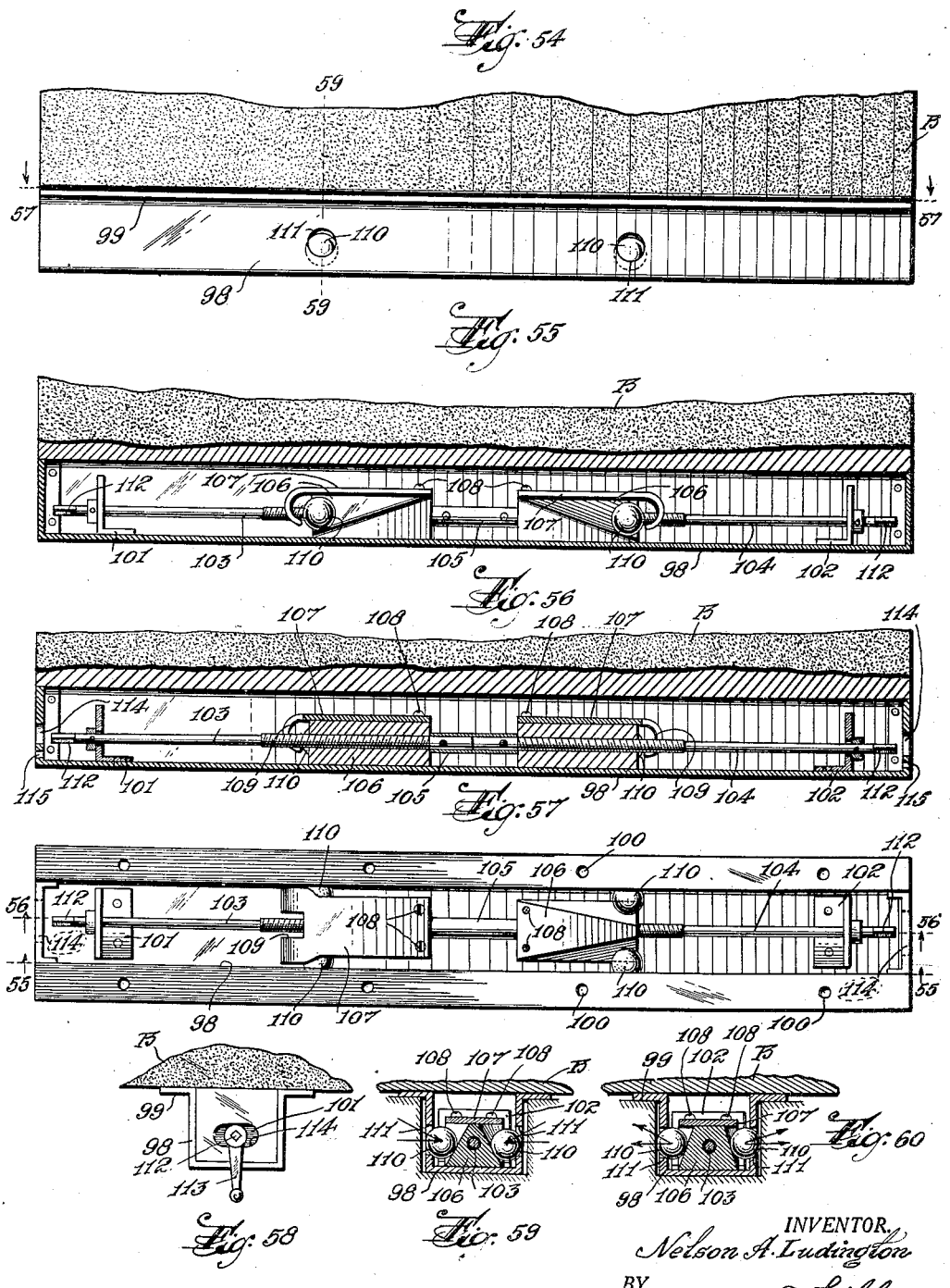

Patented May 23, 1933

1,910,398

UNITED STATES PATENT OFFICE

NELSON A. LUDINGTON, OF NEW HAVEN, CONNECTICUT

TRANSPORTATION MEANS    REISSUED

Application filed May 7, 1932. Serial No. 609,971.

This invention relates to new and novel means for transporting goods or merchandise, and is primarily directed to the problem of co-ordination in the transportation of goods or mechandise by automotive truck, rail and water conveyances.

The need for some co-ordinating unit to facilitate the cooperation of rail, water, air, and motor truck carriers of goods, rests in part on the right of the public to the best system of transportation that can be established; in part on the disadvantageous economic results of existent competitive practices; and in part on the duty of the Federal Government to establish and maintain adequate means of national safety and defense. This need has come into being as the result of many factors, prominent among which is the non-adaptability of standard railway equipment to present-day transportation requirements, together with the inertia of the railroads toward progressive adaptation thereof.

The inertia of the railways is well illustrated by the origin and growth of the express business. In the beginning, there was merely an express messenger with a hand-portfolio, sometimes supplemented with a pony, but these have been supplanted not only by the full-length express rail-car, but by whole trains of them, and the express business has become a national institution.

In the express system, the express company originally sent a messenger for the package, and later a wagon, and at the present time, a truck of some character, speed and safety being the slogans of the service which has been rendered to the public for many years, and which service is something the railways and water lines did not have the foresight to enter. In later years, the parcel-post service has supplemented the express service, both of which agencies use the railways and water lines for the transaction of their business, and both are successful. The reason for their success is that they have supplied a service which was desired and which the railways and water lines did not give; that is, a prompt pickup, rapid delivery, flexible schedules, and a complete single contract to convey the parcel from its origin to its ultimate destination.

In my study of the problem of transportation of goods or merchandise, I have determined, from articles published by authoritative sources, certain facts that show the need for a better co-ordination between the motor truck and the railways and water lines.

From these published articles I have drawn the conclusion that the railways are, roughly, four times as valuable a national asset as is the automotive transport. In spite of this, the railroads at the present day find themselves confronting a great dilemma in the loss of car-load and parcel revenue, to automotive truck competition which is largely supplementing the express and parcel-post systems.

It is my belief that the explanation of this dilemma is found in the inertia and rigidity of the railways themselves. The rigidity of the railways lies in the size of the freight cars, fixed schedules, carrying the goods only part of the way, costly regulations as to packing for shipment and other causes set forth in said articles.

It has been recognized for several years that there is a need for co-ordination between the railways and the shippers or people having goods or merchandise to transport, and it is therefore the principal object of my invention to provide a better co-ordinating transportation means which will enable the common carriers to cooperatively amplify and extend the usefulness of all systems of transportation for the common good. There are many other ancillary objects which will be apparent from a study of the specification, some of which will be stated after expressing the general nature of my invention.

For some time past it has been proposed to use containers or boxes of relatively large size for L. C. L. shipments, and my invention, broadly stated, utilizes such boxes which, after being packed and locked by the shipper, are then ready for the next unit in the transportation system, which according to my invention is in the form of a "turret truck" which comprises a truck chassis on which is mounted a turret capable of being raised and lowered and rotated in either direction through any desired angle.

The turret also carries members for receiving the load-boxes, which members are provided with means by which said members may be tilted in two directions, whereby the turret and parts thereof may be quickly adjusted to draw the box onto the turret-receiving members with the least possible delay; in fact, only two or three minutes should be required for this work, and the truck may then be on its way to the freight house or preferably directly to a platform car made to receive such boxes, and which is the third unit of the system. A platform car is a relatively cheap construction as compared with a box car, and is simply provided with means for securing thereto the form of box heretofore referred to.

The turret truck, comprising probably the most important unit in the system, is preferably also provided with a platform forward of the turret on which a container can be placed through the medium of the turret as will be later explained.

The advantages of such a system of co-ordination are many, some of which may be mentioned. The weather-proof box container designed for the goods to be carried therein is packed and locked by the shipper, and a manifest of its contents is given to the railway accompanied by a bill of lading, the railway giving a receipt for one locked container or box. This saves the handling of each individual piece from the truck into the freight house, and from the freight house into the freight car, if no freight car is available at the time the goods are hauled to the freight depot. The amount of labeling, addressing, bookkeeping, claims and accounting is materially reduced, and the insurance costs lowered because of the greater safety of these contained goods not handled in transit. The truck can call during or after business hours for the container which has been locked and sealed by the shipper; the freight rate is a flat rate for the weight carried; the boxes afford advertising space particularly for the shipper of less than carload lots. The factory location, by the use of this transportation system, is no longer necessarily determined by its proximity to the railway, and cheaper ground, lower rents and more advantageous surroundings are made available without prejudice to shipping facilities. Even the agriculturist may load one of these containers or boxes on a platform built on his land, whereby the turret truck can come and get it at the most convenient time.

With this system, no large freight house is required by the railway, merely a storage platform to which the boxes may be delivered by the truck and subsequently transferred to a flat car by the turret truck; or the boxes may be transferred from one platform car to another by the truck. The use of this system enables the storage platforms to be placed alongside the railroad at points where the land is not so expensive, thereby reducing the cost to the railroad on this item.

By the use of this system, the local freight train service may be speeded up greatly because the turret truck described herein is capable of loading and unloading the boxes from the platform car in a very short space of time, say on the order of two or three minutes. This greatly reduces switching costs and the general cost of operating such local freight trains; in fact, the schedule of such trains may be made to approach the schedule of the local passenger train. This system makes possible a schedule having an elasticity and speed that can directly compete with the truck alone.

Beside the decided advantages to the shipper and to the railways, the advantages to the receiver are many, including the saving of time, which makes prompt delivery; the merchandise or goods are not disturbed from the time they are packed until the box has been delivered; saving of freight on the packing cases, and there are no demurrage charges. To the public in general, such a system means less blocking of business streets, and fewer trucks on the streets and highways. Last but not least, the turret truck included in this system may be used to great advantage for military purposes because of the manner in which the turret of the truck may be operated, and the great advantage to be derived from the weather-proof container carrying all kinds of supplies and munitions.

My system of co-ordination will be better understood by reference to the annexed drawings wherein:

Figures 1 to 16 inclusive, illustrate schematically various conditions of loading and unloading the turret truck, having certain details of one form, and showing the versatility of the truck in taking on and delivering its load.

Figures 17 to 24 inclusive, illustrate schematically other conditions of loading and unloading of the truck, in which some of the detail features are different from the form of truck shown in Figures 1 to 16 inclusive.

Figure 25 is a side elevation of the turret truck as shown in Figures 1 to 16 inclusive, in which a box or container is on the truck platform and one on the turret.

Figure 26 is a plan view of the truck shown in Figure 25, but with the box or container on the turret removed.

Figure 27 is a rear end view of the truck shown in Figure 25.

Figure 28 is a view similar to Figure 27, but with the turret slightly raised and turned at right angles for discharging its load, comprising a box or container, from the side.

Figure 29 is a view similar to Figure 28, with one of the side channel-support members comprising the turret removed, and the turret slightly raised.

Figure 30 is a view similar to Figure 28, except that it is of the form shown in schematic manner in Figures 17 to 24 inclusive.

Figure 31 is a plan view of the turret turned ninety degrees, and with the skid-carrier and skids extended to receive or discharge a box or container from the side of the truck.

Figure 32 is a view similar to Figure 31, but with the turret turned at some intermediate angle.

Figure 33 is a bottom view of the turret along the line 33—33 of Figure 40, showing some of the circular gears used in the various motions of the turret.

Figure 34 is a bottom plan view of the truck showing some of the circular gears illustrated in Figure 33, together with the control means for rotating the turret.

Figure 34A is a sectional view on line 34A—34A of Figure 34.

Figure 35 is a view similar to Figure 34, but showing the same control means illustrated in Figure 34 for rotating the turret, and also the control means for operating the skid-chains and skids.

Figure 36 is a view similar to Figure 35, but showing only the control means for operating the skid-chain carrier.

Figure 37 is a view similar to Figure 36, but showing the control means for tilting the channel-shaped load carriers.

Figure 38 is a view similar to Figure 37, but showing only the control means for raising and lowering the turret.

Figure 39 is a transverse section on line 39—39 of Figure 40 through the upper portion of the turret looking down and showing particularly certain of the tilting and rotating mechanisms.

Figure 40 is a vertical longitudinal sectional view through the center of the turret and the operating mechanism.

Figure 41 is a transverse sectional view through the center of Figure 40 taken on two planes, showing particularly the sections through the skid-channel, the skid-carrier, and the skids.

Figure 42 is a part-elevational and part-sectional view along the line 42—42 of Figure 40.

Figure 43 is a view similar to Figure 42 on the line 43—43 of Figure 40.

Figure 44 is likewise a view on the line 44—44 of Figure 40.

Figure 45 is a part-sectional and part-elevational view through the skid-channel along the line 45—45 of Figure 41, showing the skid-carrier, the carrier-chain, and the skids.

Figure 46 is a view on the line 46—46 of Figure 41.

Figure 47 shows a detached view of one end of the skid-channel and the skid removed therefrom.

Figure 48 shows the two movable dogs used at opposite ends of the skid shown in Figure 47.

Figure 49 is a view of the rear-end of the truck showing a modified form of box and loading means.

Figure 50 is a perspective view of the end of the box showing the grapple chains for drawing the box on to the turret.

Figure 51 is a rear-end view of the modified form of box shown in Figure 49, showing the box in position on the turret.

Figure 52 is a side-view of the form of box shown in Figure 51.

Figure 53 is an end-view of the box shown in Figure 51.

Figure 54 is an enlarged view of the side-rail of the box shown in Figure 51.

Figure 55 is a section along the line 55—55 of Figure 57.

Figure 56 is a central sectional view along the line 56—56 of Figure 57.

Figure 57 is a plan view of the box-rail taken along the line 57—57 of Figure 54, with one of the ball cages removed.

Figure 58 is an end view of the box showing the application of a wrench to lock the side-rail of the box to the carrier in the channel of the turret.

Figure 59 is a section on the line 59—59 of Figure 54, and before the locking members are forced into locking position.

Figure 60 is a view similar to Figure 59, but with the locking members forced into locking position.

Figure 61 is a perspective view of one of the locking devices shown in Figures 55 to 60 inclusive, with the balls in their unlocked position.

Figure 62 is a perspective view of one of the grapple chains used for loading the box on to the turret.

In the drawings, wherein like numbers refer to corresponding parts in the various views, Figures 1 to 16 inclusive illustrate certain conditions of operating the truck, but it is to be understood that these are merely illustrative of the multitude of conditions which the truck is designed to meet.

Figure 1:
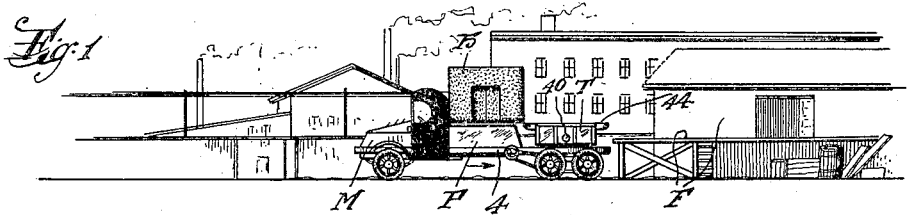

In Figure 1, the motor truck M is provided with a platform P for carrying an extra packing box B thereon. The rear end of the truck is provided with a turret T, the details of which will be set forth at length hereinafter. The truck M is illustrated as about to deliver the box B to a railroad freight shed F. It may be remarked that if it were certain when the truck started out that only one box B was to be picked up and delivered to the freight car or shed, it would be carried on the turret part of the truck, instead of being loaded on the platform P as illustrated.

Figure 2:
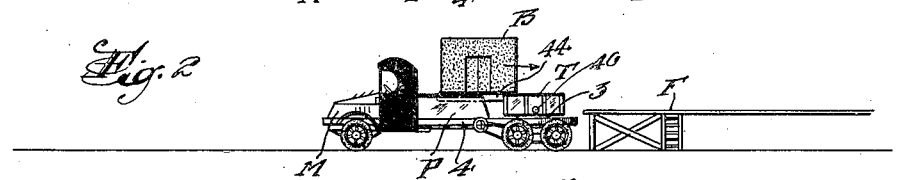
Figure 3:
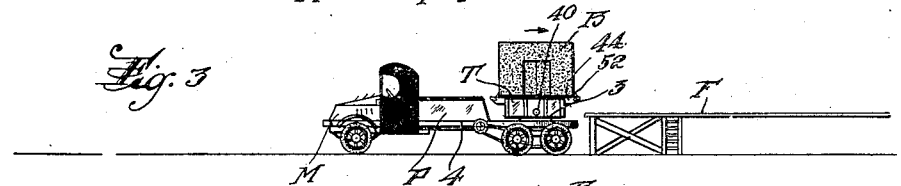

It is to be noted that in the illustration of Figure 1, the top of the turret T is somewhat higher than the platform of the freight house. To unload the box B on to the platform of the freight house, or a platform car, the skid-carrier and skids are operated by the proper mechanism to be later explained so as to project in slots in the platform P of the truck, so that the skids extend under the box B as shown in Figure 2. Then the mechanism is operated to slightly raise the turret T, and then the skid mechanism is operated to draw the box B on to the turret as illustrated in Figure 3.

Figure 4:
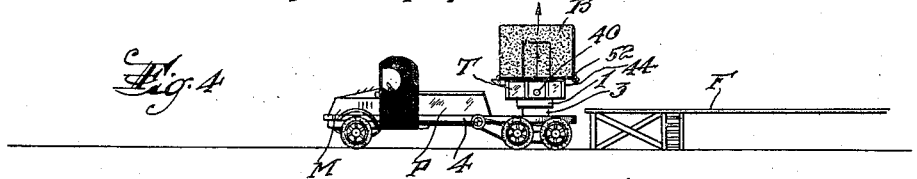

Since the platform of the freight shed is lower than the top of the turret, the skid-carrier and skids may be operated to move the box directly off the turret on to the platform, but the turret may be raised as shown in Figure 4 to illustrate the condition where the platform may be higher than that shown in the previous figures, and it may also illustrate how the box may be unloaded from the turret even though the top of the turret is above the platform.

Figure 5:
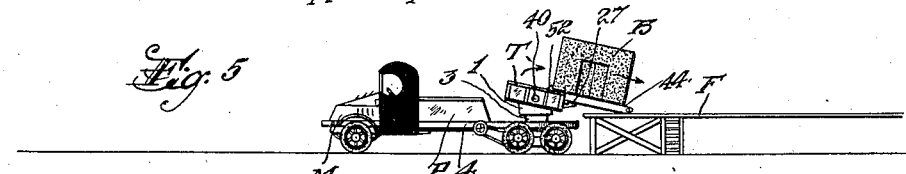

The unloading position of the skids is illustrated in Figure 5, where they are shown in their fully extended position.

Figure 6:
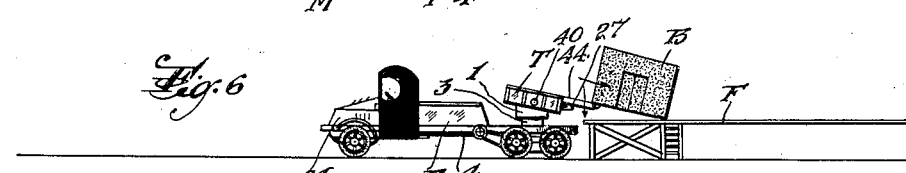
Figure 7:
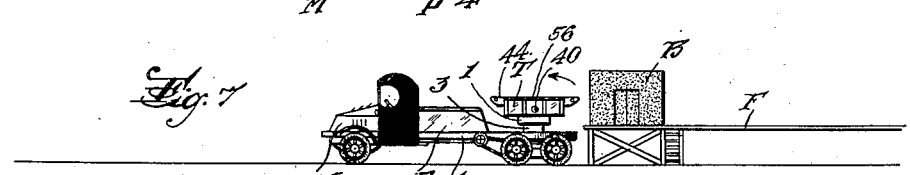
Figure 8:
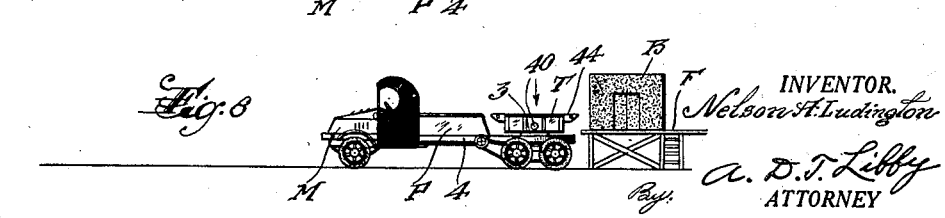

In Figure 6, the skids are shown as being withdrawn from the box which may be dropped down on to the platform by pulling the skids from under the box; or the turret may be tilted to ease the box on to the platform; or the turret may be lowered so that the box will be placed, without a jar, on the platform as illustrated in Figure 7, which also shows the skids and skid-carriers returned to their normal position in the turret, while in Figure 8, the turret has been returned to its lowermost position on the truck, now ready to go after another load.

To illustrate another condition of operation, and the wide range of adaptability of the turret truck, reference is now made to Figures 9 to 16 inclusive.

In Figure 9, the truck M is shown backing up to the box B which has been filled with goods as previously explained, ready for shipment, and is positioned on a very low platform. After the truck has been backed into position, the turret is tilted as shown in Figure 10, and the skids are extended so as to pass under one edge of the box. The truck is then backed up, sliding the box on to the skids as illustrated in Figure 11. Both ends of the skids are provided with dogs to be later described and which work automatically to engage the edge of the box so as to prevent it from sliding from the skids.

The mechanism for bringing the turret back to the normal horizontal position is inaugurated, and at the same time the skids are operated to draw the box on to the turret. It may be noted at this point that the mechanism of the truck has not less than five movements which can all be operated simultaneously, so that much time is saved in the various operations of the turret.

In Figure 13, the box is shown in full position on the turret T. In the expectation that the truck may pick up another box before it returns to a siding having a freight car thereon, or to the freight house, the box B is carried forward on to the platform P by operating the skids in the direction of the arrow shown in Figure 14, it being understood that the turret is then very slightly raised to allow the box to be carried forward on to the platform P.

In Figure 15, the box is shown in full position on the platform P, and the truck in Figure 16 is shown on its way either to the freight house, or to pick up another box.

In Figures 17 to 24 inclusive, a different form of freight box is illustrated from that shown in Figures 1 to 16 inclusive, by reason of the fact that the box itself is provided with loading shoes which will be described in detail later, and these shoes are adapted to be engaged by grapple chains for loading and unloading the box from the truck.

As illustrated in Figure 17, the box B is shown on the platform F with the truck backed into position to take on the box. This is done by running out the loading carrier, no skids being used in the arrangements shown in Figures 17 to 24, and making engagement between the shoes on the box and the carrier-chain by means of the grapples. Then part of the turret mechanism is operated so as to turn the loading chains, and the box is pulled on to the turret as illustrated in Figure 19, and if it is desired to move it on to the platform P, the movement is continued as shown in Figure 20.

As the carrier reaches the end of its movement, in which the box is somewhat nearer the cab of the truck shown in Figure 20, the grapples automatically unhook from the chain. Then to get the box all the way on to the platform B of the truck, the turret is tilted so that the carrier can be used as shown in Figure 21 to push the box into full position on the platform. Figures 22 to 24, inclusive, illustrate how the box having the loading shoes as an integral part thereof can be actually picked up from a level much lower than the turret and loaded on the truck.

In Figure 25, I have illustrated, on a larger scale than in the preceding figures, the turret truck with two boxes thereon, one on the platform P, and the other on the turret T.

In Figure 26, there is shown a plan view of the truck M, looking down on the truck, showing one of the boxes B on the platform, but without any box on the turret T. The turret T is composed of two cylindrical members 1 and 2 concentrically arranged in sliding relationship with a guide cylinder 3 positioned between them. The guide cylinder 3 is fastened to frame members 4 and 5 of the truck in any satisfactory manner as by rivets or bolts 6. The upper parts or outer ends of the cylinders 1 and 2 are anchored together by a double T-shaped cross-member 7, the ends 8 and 9 on opposite sides, and the ends of the member 7 being preferably welded to the edges of the cylindrical members 1 and 2. It is to be noted that these upper ends of the cylinders 1 and 2 are arcuately beveled at 10 and 11 over a part of their periphery so as to allow clearance during certain tilting operations of the turret.

Fastened to the cross-member 7, in any satisfactory manner as by screws or bolts 12, are plates 13 and 14. To the plates 13 and 14, are attached in any satisfactory manner, screws 15 being illustrated, bushings 16 which act as bearings for the ends of shafts 17a, 17b, 17c, and 17d. The plate 13 carries two of these bushings on opposite sides adjacent the cross-member 7, and likewise, the plate 14 carries a pair of similar bushings. One pair of shafts, 17a and 17b, (see Figs. 39 and 40) serve to actuate similar gears 18a and 18b through the medium of gear wheels 19a and 19b respectively. Since the gears 18a and 19a, 18b and 19b must remain in the same relative position in mesh while the turret is being raised or lowered, a special mounting means must be provided for the gear wheels 19a and 19b. This is accomplished as will be seen from Figure 40 by providing for each a sleeve 20 having a flanged head 21 set in a recess in the bushing or socket 16, and the flange 21 of the sleeve 20 is held in place by one of the plates 13 or 14. The sleeve 20 is slotted at 22 to form a keyway to receive a key or rib 23 on the shaft 17a and 17b, whereby the sleeve 20 may slide on the shafts 17a and 17b, it being understood that the gear-wheel 19a is keyed or otherwise fastened to the sleeve 20. The construction of the shafts, sleeves, and worm-gears is the same with respect to shafts 17c and 17d as for 17a and 17b.

The gear 19c is in mesh with gear 18c, while the gear 19d is in mesh with gear 18d. It may be remarked at this point that the gears 18a and 19a, 18b and 19b (Fig. 41) are used for actuating the skid-carrier chains and therefore the skids in the form shown in Figures 1 to 16 inclusive, or the grapples used in the form shown in Figure 49. The operation of the skid-carrier chains is provided through the medium of a pair of sleeves 24 extending in opposite directions from the center of the turret and to which the gears 18a and 18b are attached.

Each sleeve is supported by a frame bushing 25, and on this bushing is carried another somewhat similar bushing 25a which is fastened to a channel member 26, and by reason of the bushing 25a, the entire channels is allowed to pivot or swing about the bushing or bearing 25. Within the channel member 26 (see Figs. 41 and 45), is a box-like structure 27 which I prefer to term a skid-carrier, and into which the sleeve 24 projects through an aperture therein. Within the skid-carrier 27 and on the sleeve 24, is positioned a double sprocket 28 which acts as a driving member for a sprocket chain 29. As will be seen from Figures 41 and 45, the sprocket chain 29 passes through the skid-carrier 27 and over a pair of end-rollers 30a and 30b, and then over the top part 31 of the skid-carrier 27, which top part therefore acts as a support for the sprocket chain 29.

It will be noted from Figures 41 and 45 that the sleeve 24 within the skid-carrier frame 27 supports a cradle-like member 32 for the purpose of taking up slack in the sprocket chain 29, and also to increase the area of contact of the sprocket wheels 28 with the chain. To accomplish this purpose, the cradle 32 carries a pair of spaced rollers 33 over which the chain 29 rides, as clearly indicated in Figure 45. The rollers 33 also engage and turn on the base portion 34 of the skid-carrier 27. Each side of the skid-carrier 27 at the ends is provided with notches 35 in which are positioned the ends or journal bearings 36 of the rollers 30a and 30b. This provides a construction by which the rollers may be pulled out longitudinally of the carrier in order to make adjustment of the chain 29. The skid-carrier 27 is held securely in place within the channel by reason of the longitudinal shoulders 37.

The gears 18c and 18d are fastened to shafts 38a and 38b which are similarly constructed but diametrically arranged in the turret so that the construction and operation of only one will be described. The inner end of one of the shafts 38a has its bearing in the central standard 39 of the turret T and passes through the sleeve 24 and has its outer end positioned in bearing bushing or collar 40 carried by the outer portion of the channel member 26. Fastened to the shaft 38a, directly inside the carrier frame 27, is a gear 41 adapted to mesh with a rack 42 fastened to the side of the carrier frame 27 in any satisfactory manner as by being welded thereto. The side of the carrier frame 27 is provided with a longitudinal slot 43 so as to permit and limit the longitudinal motion of the carrier frame 27.

It is to be understood that the opposite side of the carrier 27 is provided with a corresponding slot 43. Thus it will be seen that the turning of the gears 18c and 18d will act to move the two carrier frames on opposite sides of the turret in longitudinal direction forward and back, depending on the direction of rotation of said gears. The mechanism for operating these gears, as well as the gears 18a and 18b, will be later referred to in the general operation of the turret.

Each of the channel members 26 also carries in its upper portion a secondary channel-like member which I refer to as skid 44 (see Figs. 41, 45, 47). The web part 45 of the skid 44 is slotted out at 46 for the major portion of its length, and positioned in this slot 46 is a T-shaped gripper slide 47 having flanges 48 underlapping the web 45 forming the edge boundary of the groove 46. The gripper slide 47 is provided with a spaced series of gripping pins 49, three groups of these being indicated in Figure 45. The depending ends of these pins are formed so as to engage between the links of the chain 29. Furthermore, the length of the pins is such that they will not frictionally contact with the top part 31 of the carrier frame 27.

To each end of the gripper slide 47 is attached a rod 50 which is supported within the web portions 45 of the skids 44. The outer ends of these rods 50 are pivotally attached to the spaced lugs 51 on the dog 52 which in turn is pivotally carried by pivot pins going through the holes 53 in the side members of the skids 44. It is to be noted that the lugs 51 are preferably provided with oblong slots 54 in order to allow for the free movement of both the rods 50 and the dogs 52. It will be noted by reference to Figures 45 and 47 that when one of the dogs 52 is in dogging or clutching position, the other one is in releasing position, and it is also to be noted that the length of the plate 47 is less than the slot 46 within which it works, the relation of the two, that is, the slide 47 and the slot 46, being such as to allow the dogs to operate to their full extent.

It may also be noted at this point that in the first movement of the chain 29 in either direction, motion will be imparted to the gripper plate 47 and this plate will slide in the slot 46 a short distance as above explained, whereby the dogs 52 will be operated simultaneously in opposite directions as indicated in Figure 45. The purpose of the automatic operation of these dogs will be later pointed out in the functioning of the entire turret mechanism.

Further operation of the chain after the dogs have been operated as described, will cause the end shoulders 55 of the plate 47 to engage the ends of the slot 46 in the skid 44, and then the entire pull of the chain will be applied to the skid in fixed relationship, and the skid will then be operated by the chain to load or unload the box as will be later pointed out. It is also to be noted that the skid is held in place at the top of the channel 26 by means of the keeper bars or plates 56 which may be fastened to the channel member 26 in any satisfactory manner. It should also be noted that the sides of the skids are provided with shoulders 57 which engage longitudinal ribs 58 in the opposite sides of the channels, thereby transferring the weight on the skids to the channels and not on the carrier 27. The skids 44 have beveled ends 59 for purposes which will be hereinafter referred to. Likewise, it may be noted that the ends of the skid-carrier are also beveled at 60.

*Tilting mechanism*

The turret is tilted through the medium of shafts 17e and 17f which carry worm-gears 19e and 19f which are similar to those heretofore described for operating the skid-carrier and the skid-chains. The gear 17e (Fig. 39) however, is in mesh with gear-wheels 61a and 61d, while the gear 19f is in mesh with gear-wheels 61b and 61c. The gears 61b and 61c operate through their respective shafts 62 and 63 to operate gears 64 and 65. The gear 64 meshes with the rack 66 on one side attached to the inner side of one of the channel members 26, while the other gear 65 is in mesh with a rack 67 attached to the inner part of the other channel member 26. In a similar manner, the gear 68 is in mesh with the rack 69 on the opposite end of the channel carrying the rack 66, while the gear 70 is in mesh with the rack 71 carried on the opposite end of the channel having the rack 67.

As the gears 64 and 65 are operated in one direction, the side channels 26 are caused to turn on the pivot bushings 25a to tilt both of the channel members 26 in unison in the same direction. When the gears 68 and 70 are operated, they act through their respective racks 69 and 71 to tilt the channel members 26 in unison in the opposite direction from that described with respect to gears 64 and 65.

It will be noted that the upper end of the standard 39 is positioned in the plate 7 and over this is attached a plate 72 which is fastened thereto in any suitable manner. To the plate 72 are fastened bearing bushings 16 as has been described with respect to the shafts 17a, etc. The lower or inner end of the standard 39 is, when the turret is in its lowermost position, located within a collar 73 carried by a base bearing member 74. The standard 39 is internally threaded to receive a threaded stud 75, the threads of which are chosen to suit the desired speed of raising and lowering the turret. The lower end of the threaded stud 75 is provided with a beveled shoulder 76 and an extension 77, on the end of which extension is fastened a beveled gear 78.

The end of the threaded stud 75 is recessed to receive the shoulder of a beveled gear 79 which is held in place by a screw 80 that is threaded into the end of the screw stud 75. The gear 79 is continually in mesh with two beveled gears 79a and 79b loosely mounted on the main drive-shaft S and adapted to be drivingly connected thereto through the medium of a clutch, the operation of which will be later described.

An annular collar 81 rests in an external annular recess on the end of the screw stud 75 which is engaged by the shoulder on the gear 79, thereby holding the gear 78 in its longitudinal position on the end of the threaded stud 75, it being understood, however, that the gear 78 is a press-fit on the end of the threaded stud 75. It will also be noted that the inner shoulder of the gear 78 has a circular recess to receive a circular gear 82 which it thereby holds in place against the frame member 74. The gear 82 is in mesh with gears 83a and 83b carried on the ends of the shafts 17e and 17f which are the shafts for operating the tilting mechanism.

The beveled gear 78 is in mesh with gear 78a and 78b loosely carried on the main drive shaft S but adapted to be connected thereto by suitable clutch member 78c and 78d slidably keyed to the main drive shaft S. The clutch members 78c and 78d are operated by forked clutch levers 78e and 78f both carried on a control rod 78g which on operation in one direction, causes the clutch 78c to engage the gear 78a, and this through the bevel gear 78 and associate gears will operate the vertical shaft 17e and cause the channel carrier supports on either side of the turret to tilt in one direction. Operation of the control lever 78g in the other direction will cause the clutch 78d to engage the beveled pinion 78b, and this will move the gear 78 in the opposite direction and consequently the shaft 17f (Fig. 39), and the channel members will be tilted in a direction opposite to that just described.

*Control mechanism for chain and skid carrier*

The annular frame member 74 has an annular recess which supports a downwardly-depending, double-flanged collar 84, the lower flange 85 of which acts to support an annular beveled gear 86 which is in mesh with the gears 86a and 86b loosely carried on the drive shaft, but operated through clutches 87a and 87b slidably keyed to the main drive shaft S, and operated by the clutch arms 87c and 87d carried on control rod 87.

On an inner annular shoulder on the gear 86, is securely positioned a spur gear 88 which is in mesh with gears 88a and 88b which operate the shafts 17c and 17d which, as has been previously described, act to move the shafts 38a and 38b that operate the chain and skid-carrier 27. The movement of the control rod 87 in one direction engages the clutch 87a with its gear 86a, and this will operate the chain and skid-carrier 27 in one direction; while operation of the control rod 87 in the opposite direction engages the clutch 87b with its gear 86b and this will operate the chain and skid-carrier 27 in the reverse direction. It is to be noted that the control rod 87 has a flattened portion 87e which passes between two fingers 87f on an arm 87g that is adapted to move back and forth automatically on a screw shaft 90, which in turn is operated by gear 90a that is driven through an auxiliary set of teeth on the spur gear 86b. When the fingers 87f reach the shoulders 87h and 87i, the respective clutches 87a and 87b are automatically disengaged and the motion of the skid-carrier is stopped.

*Control mechanism for chain and skid skids*

Loosely mounted on the main shaft S, are another pair of beveled gears 89a and 89b which are operated by their respective clutches 89c and 89d through the medium of control rod 89. The gears 89a and 89b are in mesh with a bevel gear 91 which is shouldered at 91a into an annular shoulder on the base portion of the frame member 3. A shouldered portion of the gear 91 also carries in secure engagement therewith, a spur gear 91b, and this gear is in mesh with two pinions 91c and 91d which in turn directly operate the shafts 17a and 17b (see Fig. 39), and these shafts through their respective sleeve portions 20, as heretofore described, operate the sleeves 24, and they in turn the sprockets 29 and the chains and the skids connected therewith. Thus it will be seen that the operation of the control lever 89 in one direction will move the chains and the skids in one direction from the channel support members, while operation of the control lever 89 in the opposite direction will cause the chains and skids to have a reverse direction or movement.

*Turret-turning mechanism*

Also loosely mounted on the shaft S are a pair of gears 92a and 92b which are driven by clutches 92c and 92d slidingly keyed to the shaft S. The gears 92a and 92b are connected with beveled gears 92e and 92f which are carried on stub-shafts 92g and 92h. On the stub-shaft 92g are carried spur gears or pinions 92i and 92j which are in mesh with a large spur gear 93 which has an annular recess within which are positioned a plurality of anti-friction or ball members 93a. The gear 93 and likewise the pinions 92i and 92j are held in position by an annular collar 93b and a shoulder 93c on the turret support member 3. The clutches 92c and 92d are engaged by clutch fingers 92k and 92l (see Fig. 34) which are in turn fastened to the control rod 92. When the control rod 92 is operated by the lever 92m in one direction, the clutch 92c engages 92a and the turret composed of the members 1 and 2 and all of the apparatus carried thereby is rotated in one direction; while movement of the lever 92m in the opposite direction engages the clutch 92d with the gear 92b, and the turret and all the mechanism carried thereby is rotated in reverse direction. This rotation in either direction may be 360° and no stopping mechanism is required in connection therewith.

*Turret raising and lowering mechanism*

Going back now to the mechanism for raising and lowering the turret, and referring to Figure 40, it will be seen that the pinions 79a and 79b are loosely mounted on the shaft S and adapted to be operated by a double-clutch member 94a operated by a clutch lever 94b (see Fig. 38) carried on a control rod 94. The gear 79, as has been explained, is securely fastened to the screw member 75 so that operation of the control lever 94 in one direction will engage the clutch 94a with the pinion 79a and will raise the turret, if the direction of the drive shaft S is proper; while a reverse operation of the control rod 94 will cause the clutch 94a to engage the pinion 79b, and the turret will be lowered.

Referring to Figure 38, it will be seen that a screw shaft 95 is rotatably carried between the frame members 95c and 95d and carries a spur gear 95a which is in engagement with a spur gear 95b rigidly fastened to the pinion 79a but having no mechanical connection with the gear 79 which is closely adjacent to it. The control rod 94, in addition to carrying the clutch finger 94b, also has fastened thereto a stop arm 94c, and it also guidingly carries a stop member 94d which is longitudinally movable on the threaded shaft 95 so that the up and down movements of the turret are controlled by the stop member 94d engaging either the clutch lever 94b or the stop arm 94c. It may be remarked that when the load-box is on the turret, the same is lowered to its lowermost position, and the load is carried directly by the truck chassis frame and not through the turret.

*Tilting control*

The frame members 95c and 95d also rotatably carry a third screw shaft 96 which passes through the clutch levers 78e and 78f. The screw shaft 96 (Fig. 42) carries a spur gear 96a which is in mesh with a gear 96b fastened to the back-side of the beveled pinion 78b. The screw shaft 96 carries a threaded stop member 96c which has fingers 96d which are adapted to pass over a flat portion on the control rod 78g and to engage stop shoulders 96e and 96f thereon, whereby the control rod 78g will be automatically operated by the stop member 96c when it has been advanced on the threaded rod 96. This automatic movement of the control rod 78g by the stop member 96c will cause the clutch arms 78e and 78f to move the clutches 78c and 78d according to the way the stop member 96c is moved, and this will automatically stop the tilting movement of the carrier supports.

*The five main controls*

It is to be understood that the five different control rods described; namely, 78g, 87, 89, 92, and 94, may be operated from the driving seat of the vehicle, or from any other place on the vehicle. Furthermore, the main shaft S, operating all of the mechanism hereinbefore described, may be and is preferably driven from the source of motive power on the truck. Furthermore, any one of the control levers may be operated independent of the others, or they may be all operated successively or simultaneously in order to expedite the movement of the turret or any of the mechanism carried thereby to meet the loading and unloading conditions as relatively depicted in the diagrammatic views of Figures 1 to 24 inclusive.

*Modified form of box*

In the form of apparatus shown diagrammatically in Figures 17 to 24 inclusive, the load-container or box B, which is preferably made of metal, the same as the first one described, and equipped with sliding doors and lock therefor, is provided on the bottom thereof with a pair of parallel spaced shoes 97 and 98. These shoes perform several functions as will be understood from the description of their construction and operation which follows.

Each shoe is channel-shaped having flanges 99 which are preferably welded to the bottom of the box B, or the shoes may be bolted through the holes 100 (see Fig. 57), but if bolts are used, the heads should be flush with the surface of the flanges 99 whereby a smooth surface will be presented to the support channels on the truck (see Fig. 51). A description of the interior mechanism of one of the shoes will suffice for both, as they are alike.

Fastened to the interior of the bottom of the shoe is a pair of brackets 101 and 102. Between these brackets is supported a shaft which, for purposes of assembly, is made in two parts 103 and 104 which are held together by a sleeve 105. The inner ends of the shaft portions 103 and 104 are threaded, one having a right-hand thread and the other a left-hand thread, and on the threaded end of each of said shaft portions is mounted a wedging member 106 shaped about as indicated in Figure 61. The wedging member 106 carries a retaining plate 107 which may be fastened thereto in any satisfactory manner as by screws 108. The free end of the plate 107 is curved downwardly over one end of the member 106, and is slotted at 109 to allow passage of one of the shaft portions, for example 103.

The retaining plate 107 serves to hold a pair of hardened balls 110 in position between the sloping sides of the member 106 and the side-walls of the shoe (see Figure 57) wherein one of the retaining plates is shown removed from the member 106. Substantially in alignment with the balls 110, the opposite sides of the shoes are provided with apertures 111 smaller in diameter than the diameter of the balls 110 and out of which the balls 110 may project. The outer end of each of the shaft portions 103 and 104 is provided with a polygonally-shaped end 112 to receive a wrench 113 which may be passed through a hole 114 in the ends of the shoes (see Fig. 58), whereby the shafts may be operated from two sides or ends of the box. Each end of the shoe is also provided with a hole 115 adjacent the hole 114 to receive the ends of the hook 116 (see Fig. 62) which is on the end of a grapple chain 117, the other end of which is provided with a grapple 118 designed to hook into the links of the endless conveyor or loading chain 29.

After the box B having the goods packed therein has been pulled on to the turret channel support members through the medium of the grapples 117 (see Figs. 49 and 51), the box may be securely fastened to the turret channel support members by turning the shafts in the two shoes in a direction which will cause the wedging members 106 to move on their shaft portions 103 and 104 and force the balls 110 upwardly and outwardly through the apertures 111 into engagement with the side-walls of the turret channel support members, it being understood that the shoes are drawn by the conveyer chains 29 within the channel support members as indicated in Figure 51. This will securely lock the box in position on the turret channel support members.

It may be noted that this means of locking the box to the turret members is one that is bothered but little or not at all by the accumulation of dirt, or ice in the winter, and the parts are readily forced into their various positions.

Where this type of load-box is used in the combination, the platform freight car on which the box is to be placed, is provided with channels simulating those on the turret truck, so that the boxes whether loaded or empty may be anchored securely to the freight car. Furthermore, it is to be noted that where this type of box is used, the platform P on the truck is also provided with channels P' and P'' (Fig. 34A) so that the box thereon may be locked in position in the same manner as on the turret or on the freight car.

It may be further noted in passing, that when a box with shoes is being used and it is desired to move one of the boxes from the turret to the platform P on the truck, the hooks 118 on the grapples 117 will automatically unhook from the conveyer chain 29 when the container or box B has been moved sufficiently far toward the platform P. Then as soon as the grapples unhook, the turret and associated parts will operate about as indicated in Figure 21 to push the box on to the platform P.

From what has been said, it will be obvious that my invention is susceptible of many changes in the mechanical details; for example, the turret and other members may be operated hydraulically, or the main operating shaft may be driven from the engine in the truck or by a motor operated from a battery thereon, it being understood that this main shaft is continuously turned in one direction while the turret and associated movements are taking place. It is also within the scope of my invention to mount the turret mechanism on a platform rail car for use in transferring the load-boxes from one car to another as may be sometimes necessary in "yard" distribution; or the turret and its mechanisms may be mounted on the platform of a freight shed for reasons now obvious. In addition, the type of truck may be varied through wide limits, and instead of a wheel truck as illustrated, the truck drive may be accomplished through tractors; also, the turret truck, besides its usefulness for the specific purpose of moving or handling freight as set forth, may be used for mounting military equipment thereon.

I therefore do not wish to be unduly limited in the interpretation of the appended claims.

Having thus described my invention, what I claim is:

1. Transportation means including an automotive vehicle having a turret arranged on the chassis thereof, means carried by the turret for receiving a load-box thereon; mechanism carried by said means for moving the box on and off said means, mechanism for raising and lowering the turret, and mechanism for turning the turret to a desired position to receive the load-box.

2. Transportation means including an automotive vehicle having a turret arranged on the chassis thereof, means carried by the turret for receiving a load-box thereon; mechanism carried by said means for moving the box on and off said means, mechanism for raising and lowering the turret, mechanism for turning the turret to a desired position to receive the load-box, and further mechanism for tilting the first-mentioned means as and for the purposes described.

3. Transportation means including an automotive vehicle having a turret arranged on the chassis thereof, means carried by the turret for receiving a load-box thereon; mechanism carried by said means for moving the box on and off said means, mechanism for raising and lowering the turret, mechanism for turning the turret to a desired position to receive the load-box, and further mechanism for tilting the first-mentioned means as and for the purposes described, all of said mechanisms being capable of independent and simultaneous operation.

4. Transportation means including an automotive vehicle having a turret arranged on the chassis thereof, means carried by the turret for receiving a load-box thereon; mechanism carried by said means for moving the box on and off said means, mechanism for raising and lowering the turret, mechanism for turning the turret to a desired position to receive the load-box, and further mechanism for tilting the first-mentioned means as and for the purposes described, all of said mechanisms being capable of independent and simultaneous operation, and means for limiting the amount of certain of said operations.

5. Transportation means including an automotive vehicle having a turret arranged on the chasis thereof, channel support members extending in parallel relationship on opposite sides of the turret, chain-carriers carried by said channel members, chains supported by said carriers, means extending from the turret for operating said carriers, and further means also extending from the turret for operating said chains, means cooperating with said chains for engaging a box to be loaded or unloaded from said channel members, means for tilting said channel members, and means for raising and lowering the turret.

6. Transportation means including an automotive vehicle having a turret arranged on the chassis thereof, channel support members extending in parallel relationship on opposite sides of the turret, chain-carriers carried by said channel members, chains supported by said carriers, sleeves extending from the turret into said channel members and drivingly connected to said chains, shafts extending through said sleeves and operatively connected to said chain-carriers, means for operating said sleeves and shafts in a desired direction, and means cooperating with said chains for engaging a box to be loaded or unloaded from said channel members.

7. Transportation means including an automotive vehicle having a turret arranged on the chassis thereof, channel support members extending in parallel relationship on opposite sides of the turret, chain-carriers carried by said channel members, chains supported by said carriers, sleeves extending from the turret into said channel members and drivingly connected to said chains, shafts extending through said sleeves and operatively connected to said chain-carriers, means for operating said sleeves and shafts in a desired direction, means cooperating with said chains for engaging a box to be loaded or unloaded from said channel members, means for tilting said channel members, and means for raising and lowering the turret.

8. Transportation means as set forth in claim 5, further characterized in that the chains and chain-carriers may be moved independently or simultaneously, these movements being coordinated in that the relation of the supporting members on which the load-box is carried may be varied at will with reference to the center of mass of the load-box.

9. Transportation means as set forth in claim 5, further characterized in that the chains and chain-carriers may be moved independently or simultaneously in the same or opposite direction, and further characterized in that the channel members may be tilted and the turret raised and lowered independently or together and simultaneously if desired with the chain and chain-carrier.

10. Transportation means including an automotive vehicle having a turret arranged on the chassis thereof, channel support members extending in parallel relationship on opposite sides of the turret, chain-carriers carried by said channel members, chains supported by said carriers, sleeves extending from the turret into said channel members and drivingly connected to said chains, shafts extending through said sleeves and operatively connected to said chain-carriers, means for operating said sleeves and shafts in a desired direction, means cooperating with said chains for engaging a box to be loaded or unloaded from said channel members, means for tilting said channel members, and means for raising and lowering the turret, said sleeves and shafts, tilting, raising and lowering operations being selective for independent operation or for simultaneous operation of any one with any other to meet the loading and unloading conditions.

11. Transportation means including an automotive vehicle having a turret arranged on the chassis thereof, channel support members extending in parallel relationship on opposite sides of the turret, chain-carriers carried by said channel members, chains supported by said carriers, means extending from the turret for operating said carriers, and further means also extending from the turret for operating said chains, a skid for each chain, said skid having means for engaging its chain and to be moved by it to box-engaging position, and means carried by the skid for engaging the box whereby further movement of the skid will move the box.

12. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains.

13. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids having a slide-plate with gripping pins thereon for engaging the links of the chain, and dogs positioned at the ends of said skids operatively connected to said slide-plate, one normally in engaging and the other in non-engaging position, depending on the direction of movement of the skids.

14. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids having a longitudinal slot in a part thereof and a slide-plate somewhat shorter than the slot positioned in said slot, a dog pivotally mounted at each end of the skids, one in engaging and the other in non-engaging position, and operatively connected to the ends of said slides as and for the purposes described.

15. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids having a slide-plate with gripping pins thereon for engaging the links of the chain, and dogs positioned at the ends of said skids operatively connected to said slide-plate, one normally in engaging and the other in non-engaging position, depending on the direction of movement of the skids, each of said slide-plates having a small initial movement to set the dogs, then to engage the skids and move them according to the motion transmitted from the turret.

16. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids having a longitudinal slot in a part thereof and a slide-plate somewhat shorter than the slot positioned in said slot, and having shoulders at least at the ends for engaging the skids at the ends of the slots after an initial movement of the slide-plates, a dog rotatably mounted at each end of the skids, one upright and the other flush with the upper surface of the skid, and means for operatively connecting the dogs to the adjacent ends of said slide as and for the purposes described.

17. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids being channel-shaped and having a longitudinal slot in the web part thereof for considerable of its length, a slide-plate positioned in said slot and shorter than the slot and having portions at each end to engage the skid at the ends of the slot, chain-gripping pins carried by said slide-plates, dogs at each end of the skids and operatively connected to the ends of said slide-plates, said dogs being set by the first initial movement of the chains before the slide-plates move the skids as described.

18. In a transportation means as set forth in claim 1, characterized in that said mechanism for moving the load on and off the receiving means includes; a pair of chains arranged, one on opposite sides of the turret and normally within said load-receiving means, sprockets for driving the chains and skids held in place on said receiving means and in operative engagement with said chains, each of said skids having a slide-plate with gripping pins arranged in groups and spaced according to the pitch of the links of the chains, and adapted to enter said links, dogs movably mounted on the skids and operatingly connected to said slide-plates which have an initial movement to set the dogs before the skids are moved.

19. Transportation means including an automotive vehicle having a turret arranged on the chassis thereof, channel support members extending in parallel relationship on opposite sides of the turret, sliding parts within said channel members, and means for moving said parts out and in from either end of said members, endless conveyors supported by said parts, means for operating said conveyors, and means cooperating with said conveyors to engage a load-box for loading or unloading it onto said channel members.

20. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, and means cooperating with said conveyors to engage a load-box for loading or unloading it onto said channel members.

21. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, and loading skids having gripping pins to engage the conveyors at a plurality of places spaced a distance apart, and means for holding said skids in conveyor-gripping position.

22. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, and loading skids having gripping pins to engage the conveyors at a plurality of places spaced a distance apart, means for holding said skids in conveyor-gripping position, means carried by the skids for engaging a box to be moved on or off the channel members, and means comprising part of the skids for presetting said engaging means before the skid is moved.

23. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, and means including shafts extending from the turret for tilting said channel members at either end.

24. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret.

25. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, certain of said movements having controls for limiting the same as and for the purposes described.

26. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, and means including shafts extending from the turret in pairs arranged at an angle to each other for tilting said channel members at either end.

27. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft, and means for connecting the same to said operating shafts and turret-raising, lowering and rotating means.

28. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft, clutches thereon for engaging gears associated with said turret, and shafts extending therefrom, and means for operating said clutches to get the desired movements of the mechanism as described.

29. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft, clutches thereon for engaging gears associated with said turret and shafts extending therefrom, and manually controlled devices for operating said clutches to get the desired movements of the mechanism.

30. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft operated from the vehicle source of power, clutches on said shaft, and means for operating the clutches to get any one or a plurality of simultaneous movements of the parts described.

31. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft operated from the vehicle source of power, clutches on said shaft, and means for operating the clutches to get any one or a plurality of simultaneous movements of the parts described, and stop means for automatically stopping certain of said operations after they have been initiated as described.

32. Transportation means including an automotive vehicle having a turret arranged on the chassis thereof, channel support members extending in parallel relationship on opposite side of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft operated from the vehicle source of power, clutches on said shaft, and means for operating the clutches to get any one or a plurality of simultaneous movements of the parts described, and stop means for automatically stopping the raising and lowering of the turret, the tilting of the load-carrying members, and the extent of movement of the chain support carrier.

33. Transportation means including an automotive vehicle having a turret arranged on the chassis thereof, channel support members extending in parallel relationship on opposite sides of the turret, sliding parts within said channel members, shafts extending from the turret and having operative connections with said sliding parts to move them out and in from said channel members, sleeves supporting said shafts and operated from the turret and carrying conveyor driving means, endless conveyors supported by said sliding parts and operated by said driving means, means cooperating with said conveyors to engage a load-box for loading or unloading it onto said channel members, means including shafts extending from the turret for tilting said channel members at either end, means for rotating, and means for raising and lowering said turret, a main shaft operated from the vehicle source of power, clutches on said shaft, and means for operating the clutches to get any one or a plurality of simultaneous movements of the parts described, and supplemental rotatable screw-shafts supported on the chassis frame and carrying stop members which travel longitudinal therein for automatically stopping at a predetermined place certain of said operations after they have been initiated.

34. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, driving means and clutch devices for connecting said driving means to certain of said gears as and for the purpose described.

35. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, driving means and control rods operatively connected to clutch devices in pairs, said clutch devices adapted to engage certain of said gears to transmit motion from said driving means to the turret and mechanism therein, the clutches of each pair giving opposite directions of motion through the gears connected thereto.

36. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, driving means and clutch devices for connecting said driving means to certain of said gears as and for the purpose described, said turret including a cylindrical guide member positioned between two reciprocally movable cylinders and having an external annular flange, an annular gear held in position beneath said flange with pinions in mesh with said annular gear for turning the turret, and means for supporting the cylindrical guide member on anti-friction bearings.

37. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, driving means and clutch devices for connecting said driving means to certain of said gears as and for the purpose described, said turret including a cylindrical guide member positioned between two reciprocally movable cylinders and having an external annular flange, an annular gear held in position beneath said flange with pinions in mesh with said annular gear for turning the turret, and means for supporting the cylindrical guide member on anti-friction bearings, said annular gear having a raceway formed in one face thereof, a cooperating raceway in a chassis frame member, and anti-friction bearings in said raceways.

38. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, driving means and clutch devices for connecting said driving means to certain of said gears as and for the purpose described, said turret including a cylindrical guide member positioned between two reciprocally movable cylinders, the mechanism within the turret including driving shafts connected to certain of said gears at the bottom of the turret, said shafts being composed of telescopic parts, and the guide members being slotted, whereby the turret may be raised and lowered.

39. Transportation means including an automotive vehicle having a turret arranged on the chassis thereof, load-receiving members rotatably carried on opposite sides of the turret, devices carried by said members for assisting in loading and unloading the load, said devices being operated by mechanism extending from the turret, a plurality of gears at the bottom of the turret for operating the turret itself and said mechanism therein, a main operating shaft extending below and parallel with a diameter of the turret, a plurality of driving pinions included in said gears loosely mounted in spaced relation on said shaft but in mesh in pairs at diametrically opposite points with the same gear, whereby one pinion will turn its gear in one direction, and the other pinion of the pair will turn the same gear in the opposite direction, a control rod for each pair of pinions; a clutch slidable on said shaft but fixed for rotation therewith for each pinion; and clutch arms to connect the clutches with their respective control rods.

40. Transportation means including an automotive vehicle having a turret arranged on the chassis thereof, as set forth in claim 39, further characterized in that the gears positioned at the bottom of the turret and in mesh with said pinions are concentrically arranged, whereby as many of the control rods as desired may be operated simultaneously to obtain any one of the desired movements of the apparatus as described.

41. Transportation means including an automotive vehicle having a turret arranged on the chassis thereof, as set forth in claim 39, further characterized in that the gears positioned at the bottom of the turret and in mesh with said pinions are concentrically arranged, whereby as many of the control rods as desired may be operated simultaneously to obtain any one of the desired movements of the apparatus, and further characterized in that certain of said pinions carry supplemental gear-teeth in mesh with auxiliary gears, said auxiliary gears being mounted on auxiliary screw-shafts carried by frame members, said auxiliary screw-shafts carrying traveling stops for operating certain of said control rods to stop the movements initiated by said rods.

42. An automotive vehicle having a turret arranged on the chassis thereof, load-supporting members pivotally carried on opposite sides of the turret, said members having load-handling devices carried thereby, means for turning the turret, means for raising and lowering the turret, and means extending from the turret to said load-supporting members to tilt the same, and other means for operating said load-handling devices.

43. An automotive vehicle as set forth in claim 42, further characterized in that the turret may be turned in either direction of rotation and through any angle, and the load-support members may be tilted at either end, and the load-handling devices extended from either end of said load-supporting members.

44. An automotive vehicle as set forth in claim 42, further characterized in that the turret may be turned in either direction of rotation and through any angle, and the load-support members may be tilted at either end, and the load-handling devices extended from either end of said load-supporting members, still further characterized in that all of the various movements for one direction may be brought about simultaneously.

45. A transportation means including an automotive vehicle as set forth in claim 42, further characterized in that the vehicle is equipped with a load-receiving platform forward of the turret.

46. Transportation means including an automotive vehicle having a turret arranged thereon having channel members attached thereto for receiving a load-box, said box having a pair of parallel spaced apertures, shoes for entering said channel members, means within said channel members for moving said box so the shoes thereon will enter said channels, means for connecting said means within the channel members to said shoes, and means within said shoes and having parts adapted to project out of said apertures into engagement with the side walls of said channel members to lock the box thereon.

47. Transportation means including an automotive vehicle having a turret arranged thereon having channel members attached thereto for receiving a load-box, said box having a pair of parallel spaced apertures, shoes for entering said channel members, endless chains operatively mounted within said channel members, and means for extending them without the channels at either end, grip chains for connecting said endless chains to said box-shoes, and means within said shoes and having parts adapted to project out of said apertures into engagement with the side-walls of said channel members to lock the box thereon after it has been moved into place as described.

48. Transportation means including a load-box having a pair of hollow shoes attached to the bottom thereof, said shoes adapted to fit cooperating parts on a platform made to receive the box, and locking devices carried within the hollow part of each of said shoes and operable from at least one end of the shoe for simultaneously operating all of said locking devices within the shoe for locking the box to the parts on said platform.

49. Transportation means including a load-box as set forth in claim 48, further characterized in that each shoe has apertures in its side-walls and a threaded shaft having at least one wedging member thereon, a plurality of balls held in operative position with said wedging member for projection out of said aperture when said shaft is turned in locking direction.

50. Transportation means including a load-box as set forth in claim 48, further characterized in that each shoe has apertures in its side-walls and a shaft having right and left-hand threads thereon, a threaded wedging member positioned on each of the right and left-hand shaft threads, each wedging member having a ball retainer with a ball on each side of the wedging member whereby when said shaft is turned in one direction the balls are caused to ride on said wedging member so as to project out of said apertures into engagement with an adjacent member, and when the shaft is turned in the opposite direction the balls will be allowed to recede from the apertures for the purposes described.

51. Transportation means including a load-box as set forth in claim 48, further characterized in that each shoe has apertures in its side-walls and a threaded shaft having at least one wedging member thereon, a plurality of balls held in operative position with said wedging member for projection out of said aperture when said shaft is turned in locking direction, each shoe having openings in both ends, one set of openings to receive a tool for operating the shaft, and another set being utilized with the first-mentioned set to receive grappling hooks for moving the box.

52. Transportation means comprising in combination, a box of relatively large capacity to receive a quantity of merchandise, a truck having a turret carrying members to receive the box, said turret being provided with mechanism for moving the box on and off said carrying members, and means on the truck for operating said mechanism.

53. Transportation means comprising in combination, a box of relatively large capacity to receive a quantity of merchandise, a truck having a turret carrying members to receive the box, said turret being provided with mechanism for moving the box onto the truck, and means on the truck for operating said mechanism to deliver the box directly to a platform freight car.

54. Transportation means comprising in combination, a box of relatively large capacity to receive a quantity of merchandise, a truck having a turret carrying members to receive the box, said turret being provided with mechanism for moving the box onto the truck, and means on the truck for operating said mechanism to deliver the box directly to a platform freight car, said turret and carrying-members having mechanism by which the box may be taken from and delivered to platforms of different heights, and at any relation to the longitudinal axis of the truck.

55. A transportation means comprising in combination, a box of relatively large capacity to receive a quantity of merchandise, and a truck having a turret carrying members to receive the box, and means including the turret mechanism for quickly adjusting the turret and its carrying members to suitable height and angle, whereby the box may be quickly loaded onto the truck and later quickly unloaded onto a platform.

56. As part of a transportation system which includes a load-box as herein defined, a turret having means for receiving said load-box thereon, mechanism carried by said means for moving the box on and off said means, mechanism for raising and lowering the turret, and mechanism for turning the turret to a desired position to receive the load-box, power means for operating all of said mechanisms, and means for applying the power to said mechanisms.

57. As part of a transportation system which includes a load-box as herein defined, a turret having means for receiving said load-box thereon, mechanism carried by said means for moving the box on and off said means, mechanism for raising and lowering the turret, and mechanism for turning the turret to a desired position to receive the load-box, mechanism for tilting the first-mentioned means, power means for operating all of said mechanisms, and means for applying the power means to said mechanisms.

58. As part of a transportation system which includes a load-box as herein defined, a turret having means for receiving said load-box thereon, mechanism carried by said means for moving the box on and off said means, mechanism for raising and lowering the turret, and mechanism for turning the turret to a desired position to receive the load-box, mechanism for tilting the first-mentioned means, power means for operating all of said mechanisms, and selective devices for bringing into operation independently or in any combination the several mechanisms of the turret for the purposes described.

59. A mobile unit including a turret having means for carrying a load thereon, mechanism for raising and lowering the turret, mechanism for rotating the turret, and mechanism for tilting the load-carrying means.

60. A mobile unit as set forth in claim 59, further characterized in that said load-carrying means is provided with mechanisms operated through the turret for taking on and removing the load therefrom.

61. Transportation means including a power-operated mobile-supporting structure having mounted thereon a rotatable super-structure carrying means for receiving superimposed upon it and discharging therefrom a "container" or load-box; mechanism carried by said means for moving the container or load-box onto and off from the said means, mechanism for raising and lowering said means together with its actuating mechanisms, and mechanism for turning the rotatable super-structure through any desired angle.

In testimony whereof, I affix my signature.
NELSON A. LUDINGTON.